United States Patent [19]
Ganesan et al.

[11] Patent Number: 5,812,951
[45] Date of Patent: Sep. 22, 1998

[54] WIRELESS PERSONAL COMMUNICATION SYSTEM

[75] Inventors: Kalyan Ganesan, Germantown; Ranjan Pant, Gaithersburg; Victor Liau, Gaithersburg; Robert Fischler, Gaithersburg; Kim Goh, Germantown; Barry Saunders, Frederick; Tayyab Khan, Germantown, all of Md.; Harry Johnson, Springfield, Va.; Desmond Coghlan, Ijamville, Md.

[73] Assignee: Hughes Electronics Corporation, El Segundo, Calif.

[21] Appl. No.: 344,272

[22] Filed: Nov. 23, 1994

[51] Int. Cl.$^6$ .................................................. H04J 3/00
[52] U.S. Cl. ..................... 455/445; 455/422; 455/560; 370/314
[58] Field of Search ........................... 348/12, 6; 379/58, 379/59, 60; 370/313, 314, 337, 347, 348; 455/403, 422, 426, 445, 450, 453, 462–466, 555, 551, 560, 561, 554

[56] References Cited

U.S. PATENT DOCUMENTS

| | | |
|---|---|---|
| 4,545,072 | 10/1985 | Skutta et al. . |
| 4,704,734 | 11/1987 | Menich et al. . |
| 4,879,740 | 11/1989 | Nagashima et al. . |
| 4,905,272 | 2/1990 | Van de Mortel et al. . |
| 5,121,391 | 6/1992 | Paneth et al. . |
| 5,184,347 | 2/1993 | Farwell et al. . |
| 5,349,631 | 9/1994 | Lee . |
| 5,559,804 | 9/1996 | Amada et al. ........................ 370/347 |

FOREIGN PATENT DOCUMENTS 0526285  2/1993  European Pat. Off. ............... 379/58

OTHER PUBLICATIONS

"Generic Criteria for Version 0.1 Wireless Access Communications Systems (WACS)" Bellcore Technical Reference TR–INS–001313 Oct. 1993.

*Primary Examiner*—David E. Harvey
*Attorney, Agent, or Firm*—Michael W. Sales; John T. Whelan

[57] ABSTRACT

The present invention relates to a wireless personal communications system (WPCS) having several features embodied in several forms. In one embodiment, the, WPCS includes at least one RP, a first SU in communication with the RP, and a second SU in communication with the first SU through the RP without involving the RPC in the manner contemplated by the specification. The RP may preferably include a channel switching unit for connecting the first SU with the second SU without using any tariff lines to or from an RPC. Such an RP may be used as a component in a wireless PBX or Centrex system including ISDN based systems. Another preferred embodiment provides for a walkie-talkie option where the first SU communicates directly with the second SU, preferably over an unlicensed frequency. In another preferred embodiment, a plurality of SUs in communication with an RP may be accessed individually using a single dialed number.

20 Claims, 17 Drawing Sheets

FIG. 17

| RESPONSE = 3 |
| RESPONSE STATUS |
| NR/TR STATUS |
| LENGTH = 12 |
| WACS PAYLOAD ENVELOPE (12 BYTES) |

| COMMAND = 3 |
| LENGTH = 22 |
| EOC (6 BITS) |
| SYC BITS |
| WACS SUPERFRAME # |
| TIME SLOT # |
| SC CHAN TYPE |
| SC CHAN DATA |
| L2 MESSAGE (8 BYTES) |

| RESPONSE = 2 |
| RESPONSE STATUS |
| NR/TR STATUS |
| LENGTH = VARIES |
| EOC (6 BITS) |
| RSSI |
| QI |
| WEI |
| WACS SUPERFRAME # |
| TIME SLOT # |
| SC CHAN TYPE |
| SC CHAN DATA |
| DATA FIELD |

| COMMAND = 2 |
| LENGTH = 12 |
| WACS PAYLOAD ENVELOPE (12 BYTES) |

FIG. 16

| TABLE A. DSP-WACS PAYLOAD ASSIGNMENT | | |
|---|---|---|
| DSP NUMBER | Tx WACS PAYLOAD NUMBER | Rx WACS PAYLOAD NUMBER |
| 1 |  | 0a,4a |
| 2 | 0a,4a |  |
| 3 |  | 1a,5a |
| 4 | 1a,5a |  |
| 5 |  | 2a,6a |
| 6 | 2a,6a |  |
| 7 |  | 3a,7a |

| TABLE A. (CONT.) DSP-WACS PAYLOAD ASSIGNMENT TABLE | | |
|---|---|---|
| DSP NUMBER | Tx WACS PAYLOAD NUMBER | Rx WACS PAYLOAD NUMBER |
| 8 | 3a,7a |  |
| 9 |  |  |
| 10 |  |  |
| 11 |  |  |
| 12 |  |  |

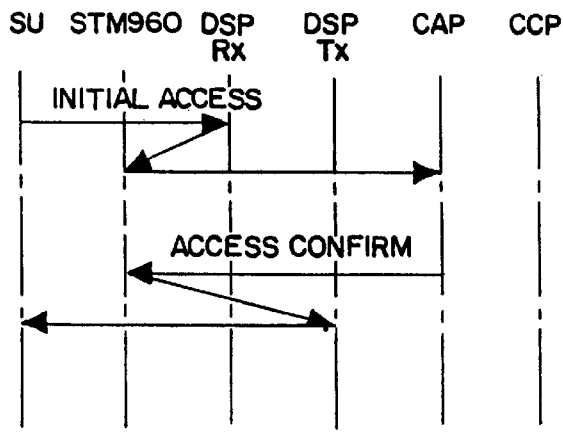
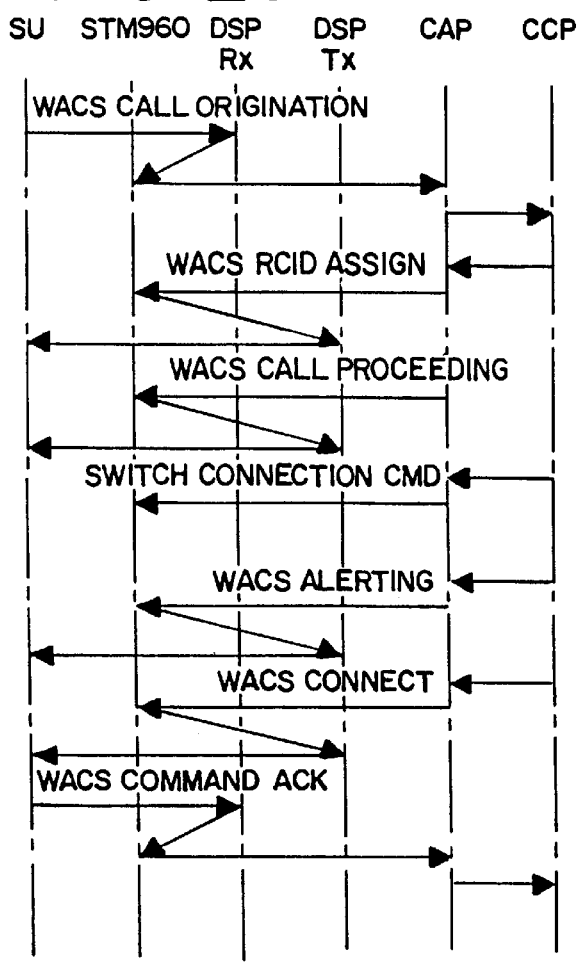
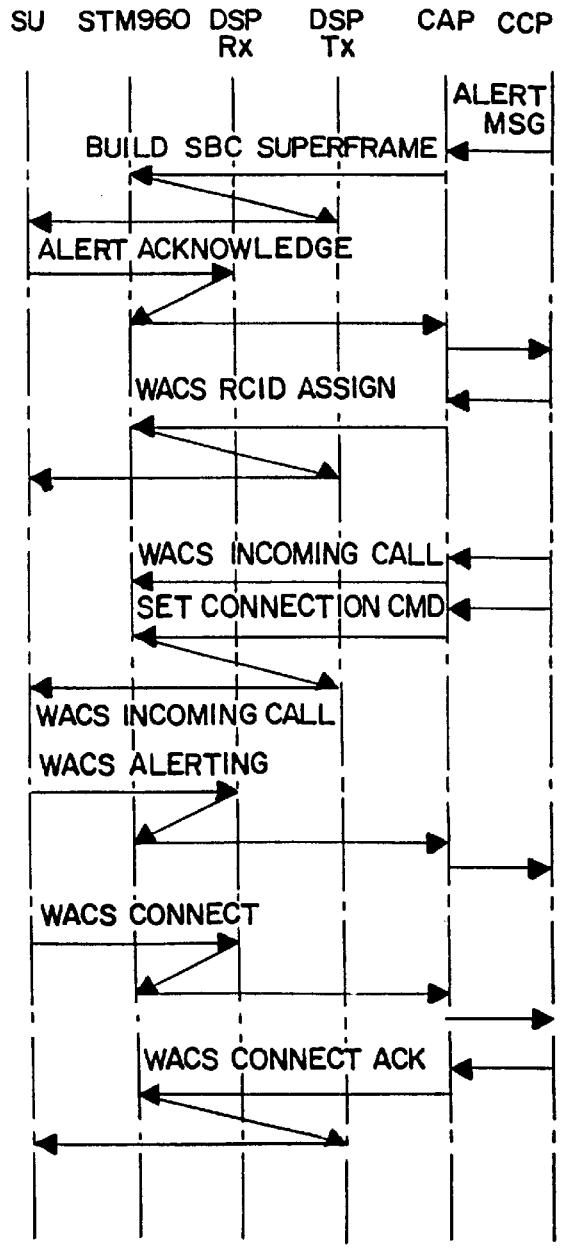

WIRELESS PERSONAL COMMUNICATION SYSTEM

BACKGROUND SECTION

Wireless access communications systems (WACS) strive to provide flexible communication services in a wireless fashion. WACS, in personal communication services (PCS) environments may provide a system for improving or eliminating drop wire requirements to homes and businesses. Radio transmitters are the vehicle for eliminating the need for wiring.

While cellular telephones and cordless telephones also provide some wireless features, certain limitations are inherent in each of these systems. Cellular telephones transmit signals to cellular base stations at relatively high power levels. The high power levels require Federal Communications Commission (FCC) approval and careful frequency planning to avoid unwanted interference. Additionally, the cellular base stations tend to be complicated and expensive units Cordless residential telephones are lower power devices, but the frequencies are usually prone to interference. Also, cordless phones require wire connections to the public telephone lines and cannot communicate with wireless access communication PCS systems. Furthermore, cellular phones and cordless phones are generally not capable of supporting both voice and data transmissions.

A typical architecture for a wireless PCS system includes subscriber units (SUs), radio ports (RPs), one or more radio port controllers (RPCs), and an access manager (AM). The SUs transmit information to the RPs using radio frequencies. RPs are small devices typically mounted to existing utility poles. The RPs are connected to an RPC using wireline facilities Each RPC is connected to a switch that is part of the public switched telephone network (PSTN) and the AM. The AM provides overall coordination of RPCs and high level control of the entire WACS system.

A consortium of telecommunication entities has recently developed a proposed standard for providing WACS PCS. This standard outlines the above-mentioned architecture. Further details concerning this proposed standard are set out in Bellcore Corp. publication TR-INS001313 entitled Generic Criteria for Version 0.1 Wireless Access Communications Systems (WACS) published October 1993 (herein sometimes referred to as the specification). The publication is available to those interested in WACS PCS from Bellcore Corp. at Bellcore, Customer Services, 8 Corporate Place—Room 3C-183, Piscataway, N.J. 08854-4156, or at 1 (800) 521-CORP, and a copy of this publication has been submitted by applicants to become part of the record of the present application. Also, the reader may refer to Bellcore manual SR-ARH-002315 describing specific modulator and demodulator requirements in the SU and the RP. The reader is presumed to be familiar with the specification and with related technological issues known to those having ordinary skill in the art.

Although a general standard has been set forth, advances and improvements to the technology have been discovered including implementation of novel configurations and circuitry. In the configuration of the general standard, SUs, whether portable or fixed, receive analog voice signals such as those spoken into a telephone handset. The SUs typically convert the analog voice signal to a digital signal and compress the digital signal. The SU then transmits the compressed signal over a radio link to an RP. The RP forwards the signal to an RPC over wireline facility.

Signals received by an RP from an RPC intended for a particular SU are transmitted by the RP, received by the SU, decompressed and converted to an analog signal to drive e.g. an earpiece. Although this architecture provides a functioning WACS PCS, it does not account for optimization of electronic hardware to perform the necessary signal processing. Also, this architecture does not cover system configurations that improve signal routing and decrease hardware requirements when specific applications arise. Furthermore, only fixed or limited mobility use is contemplated in the existing proposed standard.

Accordingly, a WACS PCS system is desirable that will operate in low power applications, support voice and data communications, and communicate with other WACS PCS systems. Optimized hardware and flexible system configurations are also desirable in a WACS PCS system, including systems which minimize or eliminate the need for transmission over tariff lines such PSTN or other commercial signal carriers.

It would also be desirable for a WACS PCS system to allow a set of portable SUs with a single dialed number to be individually accessed. Such a feature would allow each member in a family having a portable SU to be accessed individually (e.g. only the desired family member's unit may ring) even though the family only pays for a single phone line from the local phone company.

It would also be desirable if an SU in a WACS PCS system could transmit and receive both voice and data information, especially if the SU could transmit and receive the data without using a modem. Modemless data transmission over the same line used for voice communication would greatly reduce costs for the end user. Reduced costs include the cost of a separate phone line for data transmission and the costs associated with having a modem such as in a fax machine.

Another advantageous feature is a wireless personal communication system that provides data services substantially similar to those provided by traditional wireline systems. The system should transparently provide these services to subscribers. In addition, the wireless personal communication system should allow transmission of high speed data such as voice band data.

It would also be desirable for an SU and an RP to be able to use a single circuit board. A single circuit board for the SU and the RP would reduce costs of manufacture and maintenance for the SU and RP manufacturer.

It would also be desirable for a WACS PCS system to be flexible enough for use both in the United States and in other countries. It would also be desirable for the RPC to be able to interface with switching systems that are compliant with International standards. Such a system would advantageously interwork with several communication protocols associated with would comply with each country's technical specification.

It would also be advantageous for a WACS PCS system to allow new software versions to be downloaded to various components such as an SU, RP, or RPC within the system. Preferably, the same communication infrastructure used for handling normal traffic could be used for downloading the new software version. Direct downloading advantageously allows a component owner to update software within the component without requiring the owner to take any action, such as changing a PROM or sending the component to a maintenance center.

Another advantageous feature would be for the SU to be remotely activated by the wireless PCS system. Such remote activation would prevent fraudulent access and simplify the user registration process.

Another advantageous feature would be for a WACS PCS system that could use excess bandwidth in existing CATV cabling. Using existing cabling would reduce costs in providing PCS service and would allow cable operating companies to provide telephony service as well as cable programming.

SUMMARY OF THE INVENTION

Aspects of the present invention provide a wireless personal communications system (WPCS) having several features, embodied in several forms. In one embodiment, the WPCS includes at least one RP, a first SU in communication with the RP, and a second SU in communication with the first SU through the RP without involving the RPC in the manner contemplated by the specification. The RP may preferably include a channel switching unit for connecting the first SU with the second SU without using any tariff lines to or from an RPC. Such an RP may be used as a component in a wireless PBX or Centrex system including ISDN based systems. Another preferred embodiment provides for a walkie-talkie option where the first SU communicates directly with the second SU, preferably over an unlicensed frequency. In another preferred embodiment, a plurality of SUs in communication with an RP may be accessed individually using a single dialed number.

The SU may in another embodiment include a data port for directly transmitting and receiving digital information without using a modem. The SU may also include a pair of antennas mounted spatially and angularly diverse from each other, e.g., the second antenna may be at an opposite end of the SU and orthogonal (or otherwise non-parallel) to the first antenna. In another presently preferred embodiment, the SU includes a single integrated circuit performing the functions of cyclic redundancy check (CRC), modulation, demodulation, correlation, decoding, encoding, and data transport.

In a further embodiment, the SU includes a particular circuit for downconverting radio frequency signals not contemplated in the specification. The circuit includes a first downconverter section having a local oscillator centered at a first frequency, and a second downconverter section having a local oscillator centered at a second frequency. In another preferred embodiment, the SU is a portable SU for use in a wireless personal communications system and may be used in a high mobility environment. A high mobility environment may include use of the portable SU while traveling at typical vehicular speeds, e.g. 55 Mph. Operating in a high mobility environment provides a seamless connection for the end user. For example, a user may originate a conversation on a portable SU at home, and continue the conversation while driving to and then arriving at work. Any handoff performed by an originating WACS PCS system to other systems, such as a second WACS PCS, cellular system, or other telecommunication system, will preferably be substantially transparent to the SU user.

Preferably, the SU is implemented using a circuit board that may also be used in an RP. The circuit board preferably includes elements common to the SU and the RP and is configurable to support common functions such as transmission, reception, encoding, and decoding.

Another preferred embodiment provides for a wireless personal communications system including a first RP, and a second RP in direct communication with the first RP via a communications link other than (or in addition to) the normal RP-RPC-RP links contemplated by the specification. The communication link may carry audio, video, and/or data signals and may use any method of communication, preferably digital, such as a T1 line, coaxial cable, microwave connection, or fiber optic link. In a particular embodiment a plurality of RPs may be directly linked together such as in a local area network arrangement. One node in the local area network may be an RPC. Alternatively, the RPC may have a separate connection to one or more of the RPs.

A further preferred embodiment provides, in a wireless personal communications system including an RP, an SU in communication with the RP, and an RPC connected to the RP, an RPC preferably including at least one digital microprocessor having an interrupt of less than 1 millisecond. The RPC preferably has a communication backplane including a plurality of slots. Each slot is adapted to selectively receive either a T1 card interfacing to a T1 line or an E1 card interfacing to an E1 line.

The RPC may further include at least one switching transcoder module (STM) . Each STM is connected to a separate T1 line. Each switching transcoder module (STM) has at least one digital signal processor capable of processing both digitized voice and personal communication system messages. In one preferred embodiment, the STM includes at least one DSP handling both incoming and outgoing message traffic. The DSP may handle from two to six different conversations.

In another preferred embodiment, the STM has a first digital signal processor assigned to process incoming messages and a second digital signal processor assigned to process outgoing messages. The STM may further include a plurality of memory buffers in communication with the digital signal processors. The buffers may be circular buffers adapted to receive and transmit personal communication system messages from an RP or from a digital switch. Each STM may further include a central processor for allocating each time slot in each T1 communication line to at least one of the digital signal processors. The central processor preferably communicates with each digital signal processor using inter-processor data messages.

The RPC preferably includes a call control processor including state machines for processing ISDN and WACS layer 3 protocols. In one embodiment, the RPC includes a first global resource processor for balancing loading among various other processors in the RPC. The RPC may further include a second global resource processor and a disk drive coupled to the second global resource processor. The second global resource processor preferably cooperates with the disk drive to perform at least some access manager functions.

The RPC also preferably includes a channel access processor (CAP) for processing layer 2 personal communication system messages. Each of the processors within the RPC may execute a multi-tasking operating system. The multi-tasking operating system allows processors to create a thread that is associated with a routine executed by the processor. In one embodiment, a thread is created by the operating system for at least one routine performing call processing functions.

Another aspect of the present invention is that the RP or the RPC or both may include a method of modulating and demodulating signals for communication over unused bandwidth of CATV cabling. An RPC may be located at the headend of the CATV system or at other nodes in the CATV system. In this embodiment, a cable television provider may conveniently provide telephone service as well as cable television to their customers, and/or existing cabling may be used to minimize installment cost of a wireless PCS system.

A further embodiment of the present invention provides a method of maintaining user registration data in a wireless personal communications system including the steps of: timing a period directly after an SU user hangs up, maintaining power to the SU and a connection between the SU and the personal communications system until the timer reaches a predetermined value, and shutting down the SU after the timer reaches the predetermined value. The method of maintaining user registration is preferably incorporated into a power saving standby mode in the SU. The standby mode periodically depowers the SU during times of limited message activity.

A further aspect of the present invention provides a method for downloading a set of system upgrades to any component, such as the SU, RP, RPC, or AM, in a wireless personal communications system. The method of downloading includes the steps of monitoring usage of the component receiving downloaded information, downloading a set of system upgrades to the component if the component is inactive, verifying that the component received the complete set of system upgrades, and then implemented the downloading system upgrade. Also, the wireless PCS system may include a table matching each component with their current software version. Downloading a component advantageously reduces or eliminates the need to change a PROM or otherwise reprogram a user's component. Downloading is particularly useful for sending system upgrades to SUs and RPs since these components are likely to be owned by individuals.

A further embodiment provides a stand-alone wireless personal communications system including a plurality of portable SUs that may communicate with at least one local RP. The RP transmits to and receives signals from the plurality of portable SUs. The stand-alone system serving a home, office or campus, can service SUs and provide flexible communication without using any PSTN or other tariff carriers. The stand-alone system may also be combined with direct SU—SU communication such as the walkie-talkie embodiment described above to provide an intercom or paging feature. The intercom feature allows SU users to send messages or page other SU users within the broadcast range of the SUs. If desired, the system may optionally port to an external network such as the PSTN or a WACS PCS system.

Alternatively, stand-alone systems may be networked with each other. For example, an RP in a first stand-alone system may communication with an RP in a second stand-alone system via radio or other communication device such as a wireline facility. Many other connections and alternative configurations of stand-alone system are possible. For example, a stand-alone system may function as a wireless PBX replacing traditional PBX systems. Such a wireless PBX may be a node, or several nodes, in a local area or wide area network. The wireless PBX may also be connected to other PBX systems (wireless or standard wireline PBX systems) at other locations, such as in a wide area communication systems.

The invention itself, together with further attendant advantages, will best be understood by reference to the following detailed description, taken in conjunction with the accompanying drawings.

BRIEF DESCRIPTION OF THE DRAWINGS

FIGS. 15–20 are diagrams of various internal communication messages which may be used within the STM of FIG. 13.

FIGS. 25–27 are message flow diagrams showing a preferred embodiment of various messages between an SU and an RPC.

DETAILED DESCRIPTION OF THE DRAWINGS

Figure 1:
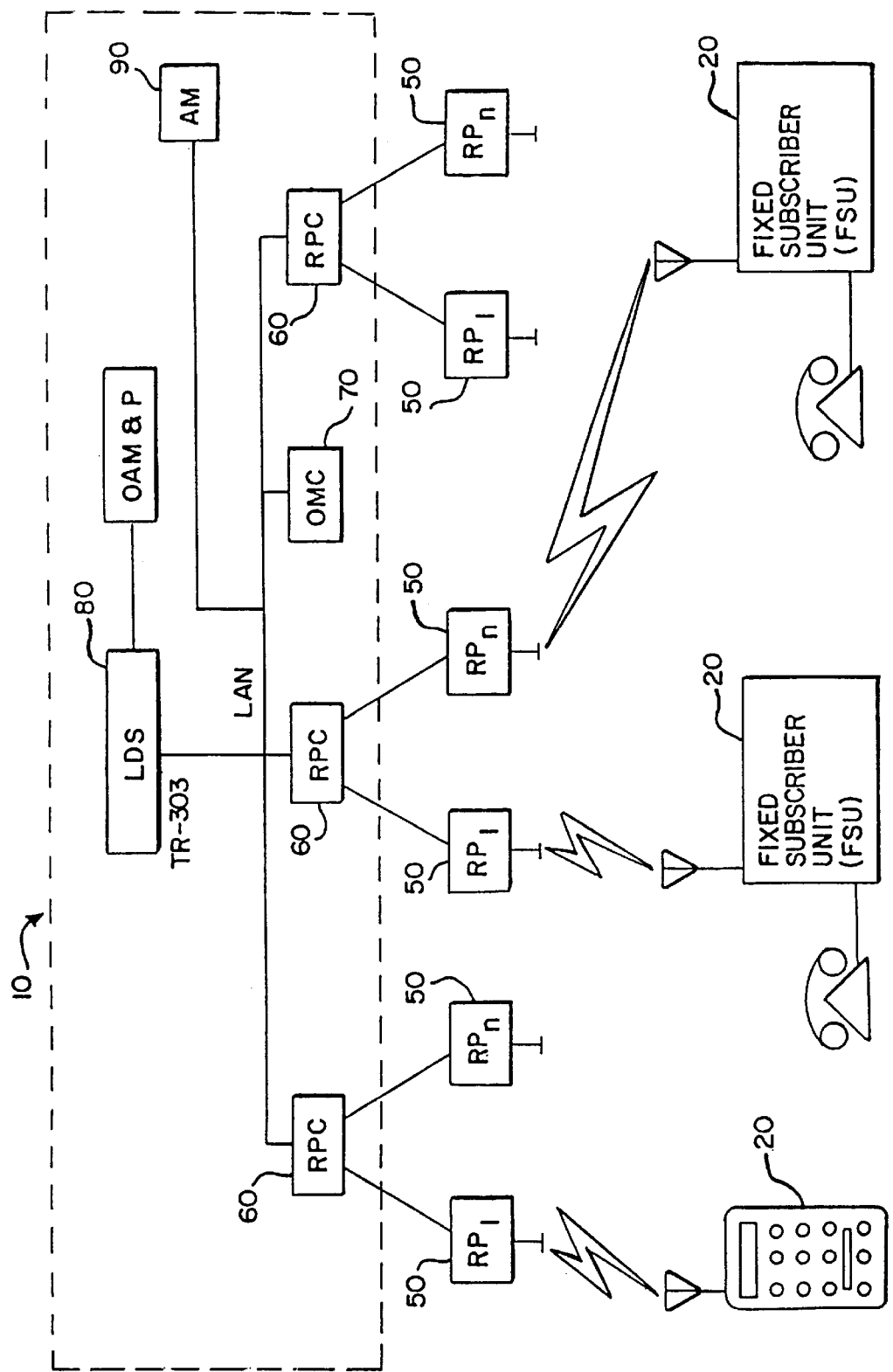
FIG. 1 is a block diagram of a standard wireless access communication system.

FIG. 1 illustrates a general block diagram of a standard wireless access communication system (WACS) 10. The WACS 10 includes subscriber units (SU) 20, radio ports (RP) 50, radio port control units (RPC) 60, an operations maintenance center (OMC) 70, a local digital switch 80, and an access manager (AM) 90. The SU 20 communicates with the radio port 50 via radio links. Each RP 50 communicates with an RPC 60 via transmission lines, typically standard T1 lines. The RPC 60 controls radio links and transmission lines carrying various voice and data communications. The switch 80 controls access between wireless access communication systems (WACS) 10 and the public switch telephone network (PSTN). The AM 90 provides call control and also communicates with the switch 80 providing voice paths between the WACS network and the PSTN. Additional details are known to those skilled in the art and are set forth in the Bellcore specification. Recently, a newer proposed standard, personal access communications (PACS), has been introduced. Both WACS and PACS standards, however, may be implemented on the system described below.

The SU 20 may be either a fixed subscriber unit or a portable subscriber unit. A fixed subscriber unit may be connected to an analog telephone by standard two (or more) wire analog telephone lines. The SU 20, fixed or portable, provides voice and data quality comparable to a wired system. A portable subscriber unit is similar to the fixed subscriber unit 20 but also includes a mouthpiece, an earpiece, and a user interface keypad. The portable subscriber unit 20, in one embodiment is similar to a cellular phone. In another embodiment, the portable SU 20 is functionally similar to a cordless phone. Unlike many cordless and cellular phones, however, the portable SU 20 digitally processes and filters all voice signals prior to broadcasting. Subscriber units 20 provide wireless access for both voice and data information. Unless otherwise indicated, the term subscriber unit (SU) applies to both the fixed and the portable versions in the following descriptions.

An SU 20 may be located in the home or the office. Multiple SUs 20 may be in range of a single RP 50 and may be in broadcast range of each other. One embodiment of the present invention includes SUs 20 capable of directly communicating with each other in an intercom-like or walkie-talkie system. Another embodiment provides SUs 20 that can communicate with each other through a common RP 50 configured with a call switching capability. Thus, SU 20 to SU 20 calls may be made without routing through the RPC 60 or other components of the system. Alternatively, calls between SUs 20 may be switched through an RPC without performing any compression processing.

Another feature of the SU 20 is a distinctive ring capability which may provide individual annunciation or pager functions. In this embodiment, a group of SUs 20 in a home or office environment are assigned the same phone number identifier. Each SU 20 programmed to this phone number can be individually accessed. Individual access may be accomplished by adding a suffix code to the telephone number. The suffix code may cause only one of the SUs 20 to ring or all of the SUs to ring with an identifying tone specific to one user.

Preferably, the portable SU 20 may be used in either low mobility, pedestrian environments or in higher mobility, automobile environments. In a high mobility environment, the RPC streamlines processing by sending some of the layer 2 messages from at least one of the DSPs in the STM instead of processing the message in the CAP. Also, the SU 20 may include a plurality and preferably two receive chains. One of the receive chains is dedicated to sweeping for optimal frequencies, and the other receive chain communicates with the RP 50.

Figure 2:
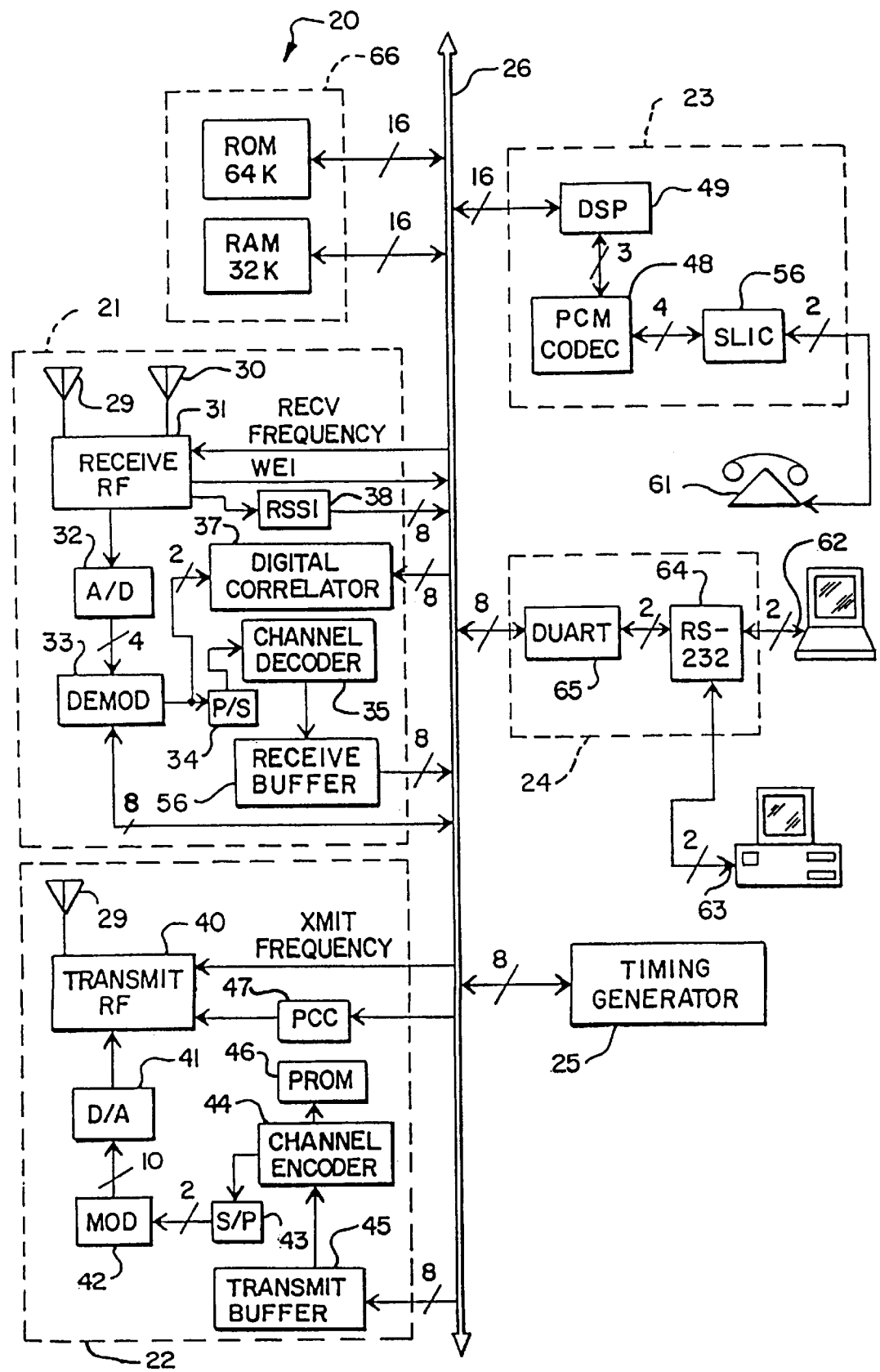
FIG. 2 is a block diagram of a presently preferred embodiment of an SU according to the present invention.

Referring to FIG. 2, a preferred implementation of an SU 20 is shown in greater detail. The SU 20 has five connections to the outside environment: an RF receive antenna 30, an RF transmit antenna 29, a telephone connection 61, a data port 62, and a debug port 63. Internally, the subscriber SU 20 comprises an RF receive section 21, an RF transmit section 22, an analog port 23, a digital dataport 24, a timing generator 25, a memory section 66, and a databus 26 connecting all the internal blocks together.

The RF receive section 21 receives an RF input signal from the antenna 30. As shown in FIG. 2, there appear to be two antennas 29, 30 connected to the receive section 21. One antenna 29 is actually switched between the transmit and receive sections 21, 22 in standard WACS/PACS PCS. The RF section 21 recovers voice information from the RF signal in the form of a 32 kilobit per second (kbps) ADPCM signal. The RF section 21 also demodulates correlation information in the RF input signal. The received information, whether voice or data, is then placed on the databus 26.

The RF transmit section 22 receives voice or data information from the databus 26 and performs the function of transmitting voice or data information. Voice information is compressed to 32 kbps ADPCM and data information is simply modulated onto RF signals for transmission. In another embodiment the SU 20 may transmit or receive from another SU 20 directly.

The analog port 23 receives analog information such as from an analog telephone and converts it to digital 32 kbps ADPCM for further processing and transmission over a radio link. Voice information arriving from the databus 26 in 32 kbps ADPCM form is converted to an analog signal and is communicated to a telephone connected to the port 23. The digital port 24 manages data signals sent to and from both the debug port 63 and the data port 62. The databus 26 is a data line connecting the various internal functions of the SU 20. Preferably, the databus 26 is a 16-bit wide communication line.

In a preferred embodiment, a standard two wire loop connects the analog port 23 to a standard analog telephone. Analog voice signals picked up at the handset of the telephone will be converted in a subscriber line interface chip (SLIC) 56 from the two wire signal to a four wire signal. The four wire format voice signals are sampled and coded into a 64 kilobit per second mu-law pulse code modulated (PCM) signal by a PCM codec 48 in the SU 20. The digital signal is then processed in the digital signal processor (DSP) 49 which compresses the PCM signal into a 32 kbps ADPCM signal. In a portable SU the SLIC 56 is unnecessary because the voice signals are received from a mouthpiece attached to the portable SU. In one preferred embodiment the same circuit board may be used for either portable or fixed applications. A switch or jumper may be used on the circuit board to designate the board's application. Alternatively, the board may be loaded without the SLIC 56 when a portable SU is desired. The universality of the circuit board design allows for cost savings to consumers and system operators.

In either type of SU, the DSP 49 sends the ADPCM signal along a databus 26 to the RF transmit section 22 where it enters a transmit buffer 45. The digital signal is temporarily stored in the transmit buffer 45 and then is transferred to the channel encoder 44. The channel encoder 44 encodes the digital signal with synchronization information in accordance with instructions stored in a programmable read only memory (PROM) 46 integrated circuit. The program stored in the PROM 46 is the decoding and encoding algorithm disclosed in the Bellcore specification which anyone of ordinary skill in the art may program in to a PROM or other memory device. The encoded digital signal is transported through a serial-to-parallel (S/P) converter 43 to a modulator 42. The encoded signal is then converted from digital to analog in a digital-to-analog (D/A) converter 41 and transmitted from the transmit RF section 40 by an RF antenna 29.

Digital data signals originating at the digital input port 24 follow a different path. Initially, the signal coming in at a digital port 24 passes through an RS-232 connection 64 into a DUART device 65. The data information signal, unlike a voice signal, is not compressed into ADPCM format. The digital data signal is not processed in the PCM codec 48 or DSP 49. Instead, it proceeds along the same databus 26 as the voice signals and goes directly to the transmit buffer 45, the encoder 44 and then to the MOD 42 for modulation onto a carrier frequency.

After modulation, the signal (regardless of whether voice or data) is then converted to an RF signal approximately within the range of 1.8 to 2.2 GHz and transmitted from the RF transmit section 22 at an average power of approximately 10–20 milliwatts. The peak power transmitted is approximately 80–160 milliwatts.

In standard WACS PCS, the output power of the RF transmit section 22 is controlled by a power control channel (PCC). The PCC can control the output power in steps of 0.75 dB±0.25 dB steps, with the total adjustment range being approximately 30 dB. In a preferred embodiment, a power controller 42 in the RF transmit section 22 of the SU 20 translates the power control instructions originating from the RPC 30.

Signals received by the SU 20 from a WACS/PACS PCS system first arrive at the RF antennas 29, 30 and are processed through a receive RF unit 31. The received analog signals are converted to digital form in an analog-to-digital (A/D) converter 32 and then demodulated in a demodulator 33. The demodulated wave form is then passed through a parallel-to-serial (P/S) converter 34, decoded in a channel decoder 35, and passed through a receive buffer 36. As part of the demodulation and decoding of the signal, the signal is also passed through a digital correlator 37 to analyze timing synchronization. The decoded signal in the receive buffer 36 then passes on to the databus 26 to the appropriate analog or digital port 23, 24 as determined by the DSP 49. Suitable parts for the A/D and D/A converters 32, 41 are a CXD1175AM-T6 A/D converter and a CXD1171-T6 D/A converter available from Sony Corporation. The Demod and Mod 33, 42 are preferably components as described in Bellcore specification.

Figure 3:
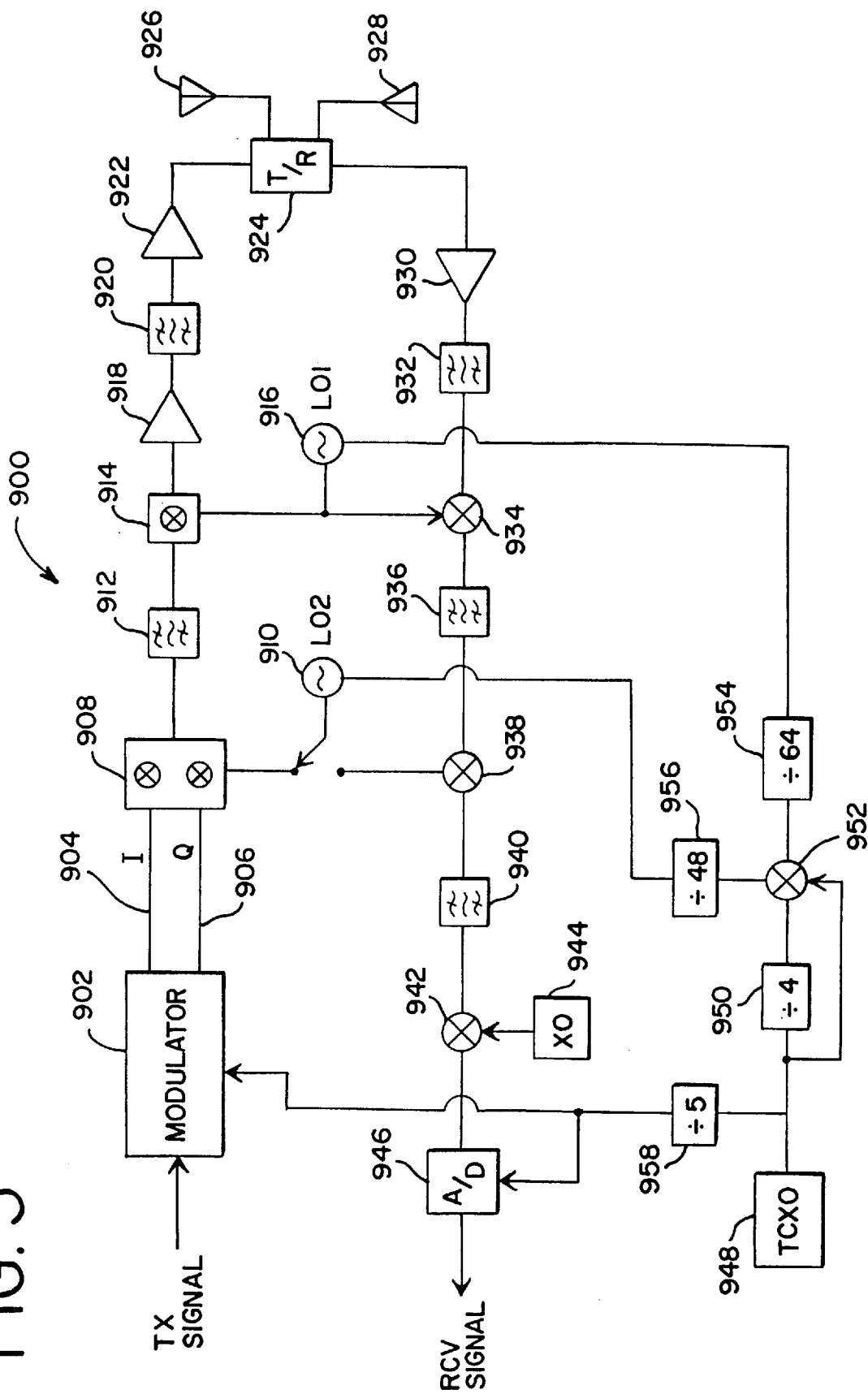
FIG. 3 is a block diagram of a preferred RF section of a portable SU.

FIG. 3 shows a block diagram of a preferred embodiment of an RF transmit and receive section 900 for a portable SU. On the transmit (Tx) signal side, the RF section 900 has a modulator 902 that modulates the outgoing digital signal into I 904 and Q 906 lines which connect to a pair of I,Q mixers 908. The pair of I,Q mixers 908 utilize the reference frequency from a second local oscillator (LO2) 910 to mix the I and Q transmit signals 904, 906 to a first intermediate frequency (IF) transmit signal preferably centered at 295.15 MHz for licensed band frequency transmissions. The first IF transmit signal is then filtered in a bandpass filter 912, preferably a discrete circuit of inductors and capacitors centered at 295.15 MHz, before being mixed again in a mixer 914.

The mixer 914 receives the first IF transmit signal and a mixing frequency from a first local oscillator (LO1) 916. The LO1 is preferably capable of producing frequencies in the range of 2.125 to 2.205 Ghz adjustable in 300 kHz steps. The first IF transmit signal is mixed to a higher frequency second IF transmit signal in the mixer 914 preferably in the range of 1.85 to 1.93 GHz. After mixing, the second IF is passed through a first gain stage 918, a bandpass filter 920 with a pass band of preferably 1.85 to 1.93 GHz, and a second gain stage 922. Once the signal passes through the second gain stage 922, it proceeds through a transmit/receive (T/R) switch 924 that connects the signal to an uplink antenna 926 for broadcast over the airwaves.

Received signals in the range of 1.91 to 1.99 GHz arrive at both the uplink antenna 926 and the downlink antenna 928. The T/R switch 924 connects one of the antennas to the receive portion of the RF section 900. The received signal is first amplified in a gain stage 930, such as a low noise amplifier to control the noise figure, and is then passed through a bandpass filter 932 with a pass band of 1.91 to 1.99 GHz to a mixer 934. The mixer 934 mixes the received signal with a reference frequency generated by LO1 916 to create a first IF receive signal. A bandpass filter 936 centered at 215.15 MHz and connected to the mixer 934 filters the first IF receive signal.

The filtered first IF is then mixed in a second mixer 938 and downconverted to a second IF preferably centered at 10.7 MHz. Another bandpass filter 940 filters the second IF and connects to a third mixer 942. The third mixer 942 down converts the second IF to a third IF, preferably centered at 768 MHz by mixing the second IF against a reference frequency. In a preferred embodiment the reference frequency is a 9.932 MHz signal generated by a crystal oscillator. The third IF continues on to an analog-to-digital (A/D) converter 946 and the rest of the SU circuitry for timing measurements and recovery of the voice or data information.

The RF transmit and receive section 900 is based on a frequency scheme determined by the reference oscillator 948 which is preferably a temperature controlled crystal oscillator (TCXO) set at 15.36 MHz. The TCXO 948 signal is passed through a divide-by-four (÷4) circuit 950 and connected to a mixer 952. The mixer 952, in one embodiment, may be an image rejection mixer. The mixer 952 receives the divided TCXO 948 signal and a signal directly from the TCXO 948. The mixer 952 mixes these frequencies to a higher frequency, preferably 19.2 Mhz. The 19.2 MHz reference frequency branches off into two paths. One path connects to a divide-by-48 (÷48) circuit 956 and the other path connects to a divide-by-64 (÷64) circuit 954. The ÷64 954 signal, preferably a 300 kHz signal, is connected 916. The ÷48 circuit 956 preferably produces a 400 kHz signal and is connected to LO2 910. The TCXO signal also passes through a divide-by 5 (÷5) circuit 958 for use by the A/D converter 946 as a 3.072 MHz reference. Other frequency schemes may be used and the TCXO signal may be used to create reference frequencies to the rest of the SU.

In a preferred embodiment, the central processing unit managing the processes in the SU 20 is a digital signal processor (DSP) 49. A Texas Instruments TMS320C50 DSP chip is suitable. Other DSP chips, such as a TI TMS320C53 may also be used. The DSP 49 is used for both signal controls and performing the 32 kbps ADPCM speech encoding/decoding. In one embodiment, the DSP 49 operates as a 16-bit parallel load processor utilizing a 16-bit wide data bus 26. The DSP 49 is driven by a clock frequency received from the RF transmit 22 and receive 21 sections. Preferably the clock frequency is approximately 16 MHz (see FIG. 3 TCXO) but higher or lower frequencies may be used.

Another embodiment of the SU 20 includes an application specific integrated circuit (ASIC) for performing the control functions of cyclic redundancy checking, general synchronization of incoming and outgoing signals, digital phase-locked loop. In addition, the compression/decompression of the signals may be completed by the ASIC. Referring again to FIG. 2, an ASIC may replace the channel decoder 35, channel encoder 44, digital correlator 37, and the DUART 65.

Two components in the SU 20 require the attention of the DSP 49. The DUART 65, which handles data flow, and the channel encoder/decoder 44, 35, which is preferably a single chip such as a Xilinx XC4005-6PQ208C, both generate interrupts to indicate that there is incoming data or that the component is ready for more data. The channel encoder/decoder 44, 35 generates two separate interrupts; one for encoding and one for decoding.

Figure 4:
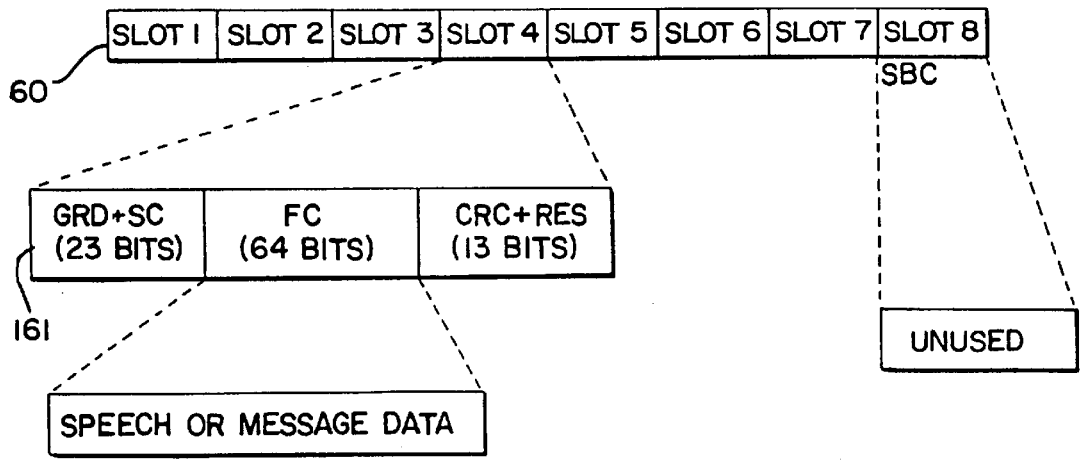
FIG. 4 is an illustration of a preferred message format sent by the subscriber unit of FIG. 2.

In standard WACS/PACS PCS, the SU 20 employs a time division multiple access (TDMA) method of communicating digital information to a radio port 50. As best seen in FIG. 4, the formatted information transmitted from the SU 20 to the RP 50 is arranged in eight time slot frames 60, each time slot 161 comprising 100 bits of information. The SU 20 broadcasts information onto one of the time slots 161 in radio transmission bursts to the RP 50. A particular RF frequency can carry one frame 60 of information. In a preferred embodiment the SU 20 can sweep in frequency for available time slots in a message 60.

Each 100 bit burst of information lasts approximately 250 microseconds and is synchronized such that the burst always corresponds with an appropriate time slot 161 that the SU 20 reserved for the particular transmission. Each time slot 161 of the transmitted message frame 60 carries information necessary to synchronize the SUs 20 transmission burst. Each TDMA burst from an SU 20 contains several information fields: guard band (GRD), slow channel (SC), fast channel (FC), cyclic redundancy check (CRC), and a reserved bit (RES).

The GRD and SC fields contain error information. The FC contains the speech or data transmitted from the SU 20 to the RP 50. The CRC information is computed at the SU 20 and used to compare against CRC data computed in the RP 50 for error detection or correction.

Figure 5:
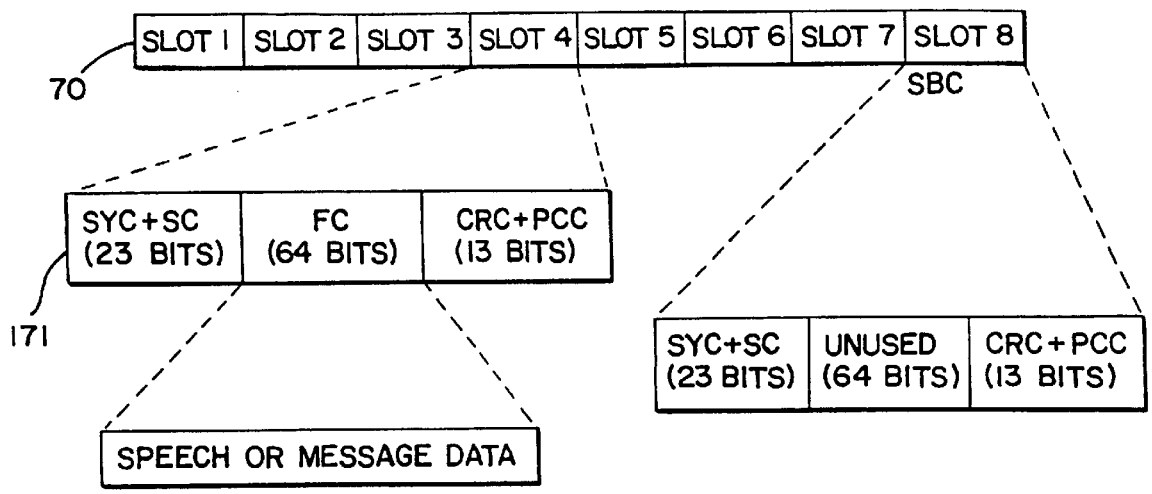
FIG. 5 is an illustration of a preferred message format sent by a radio port.

FIG. 5 depicts the standard formatted information received by an SU 20. An RP 50 transmits voice or data information to an SU in time division multiplex (TDM) format. TDM transmissions are continuous radio transmissions as opposed to the TDMA bursts. Again the SU 20 is allocated to a specific 100 bit time slot in a frame 70. The time slot 70 includes a synchronization pattern (SYC), a slow channel (SC), a fast channel (FC) containing the speech or data transmitted from the RP 50, a cyclic redundancy code (CRC), and power control channel (PCC) information.

The SYC and SC information comprise a 23 bit message that the SU 20 uses to synchronize with the RP 50. Synchronization and correlation are performed by the Xilinx chip.

The CRC represents data computed at the RPC 60 useful for determining errors in transmission.

The channel encoder 44, such as a XC4005-6PQ208C from Xilinx at 2100 Logic Drive, San Jose Calif. 95124-3400, preferably encodes a digital voice signal with the proper digital correlation information. The encoded signal is then modulated preferably using quadrature amplitude modulation (QAM) with a raised-cosine spectral shaping filter.

Figure 6:
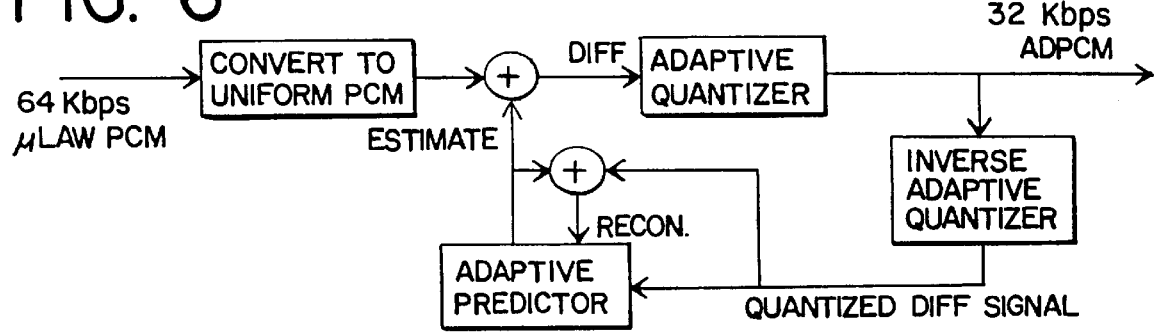
FIG. 6 is a functional block diagram of an encoder in the subscriber unit of FIG. 2.

As seen in FIG. 6, a preferred method of encoding voice data generated at the SU 20 is to take the 64 kbps mu-law PCM signal created at the PCM Codec 48 and encode the information into 32 kbps ADPCM. Preferably the DSP 49 performs the encoding. The encoding is based on the CCITT Recommendation G.721 standard algorithm. The encoding process begins by converting the mu-law PCM to uniform PCM. After conversion to uniform PCM, a difference signal is obtained by subtracting an estimate of the input signal from the input signal itself. An adaptive quantizer is used to assign four bits to the value of the difference signal per sample. An inverse quantizer produces a quantized difference signal from these four bits. The signal estimate is added to this quantized difference signal to produce the reconstructed version of the input signal. Both the reconstructed signal and the quantized difference signal are operated on by an adaptive predictor which produces the estimate of the input signal, thereby completing the feedback loop.

Figure 7:
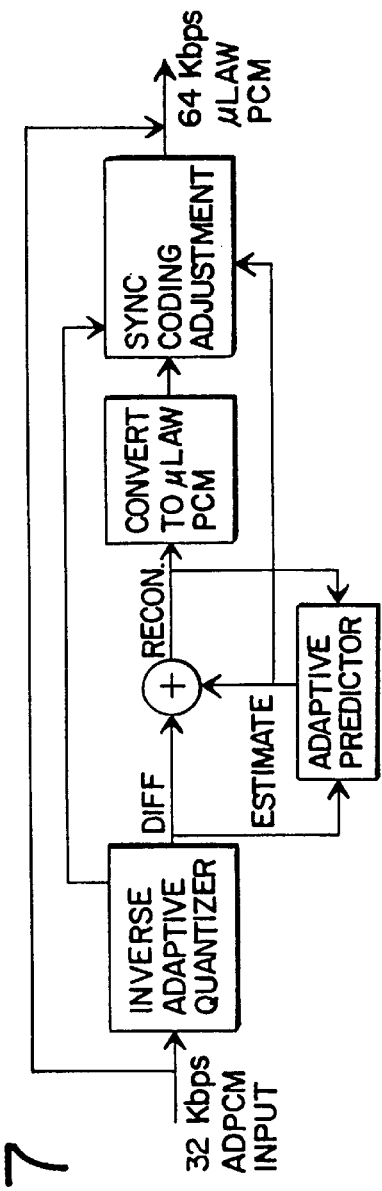
FIG. 7 is a functional block diagram of a decoder in the subscriber unit of FIG. 2.

Voice signals received on the antennas 29, 30 (FIG. 2) are 32 kbps ADPCM signals modulated on RF frequencies. The signals must be demodulated, converted to 64 kbps mu-law PCM in the DSP, and sent to the PCM Codec 48 for conversion into analog signals. The decoding, as illustrated in the functional block diagram of FIG. 7, is performed in a functional structure similar to the feedback portion of the encoder algorithm together with a uniform PCM to mu-law PCM conversion and a synchronous coding adjustment. The adjustment prevents cumulative distortion on synchronous tandem codings.

In a preferred embodiment the SU 20 includes a delayed deregistration feature and standby mode. The delayed deregistration feature operates to keep an SU 20 registered on a WACS/PACS PCS system for a period after the SU 20 terminates a communication (i.e., hangs up). This feature helps to avoid problems associated with inadvertent disconnections and helps to speed up system access to the system for consecutive telephone/data calls. One embodiment of this feature includes a timer built in to the SU 20 to keep the SU registered with the system for a predetermined period of time after a disconnection, planned or inadvertent. Another embodiment of this feature is to control the SU power down from a timer located in the RPC that will keep the SU registered for a predetermined period of time.

RADIO PORT

In standard WACS/PACS PCS, the radio port (RP) 50 performs the basic function of transmitting and receiving voice and data information between the SU 20 and the RPC 30. The RP 50 exchanges information with one or more SUs 20 over a radio link at RF frequencies, preferably in the range of 1.8 to 2.2 GHz. The RP 50 may exchange information with a single RPC 30 over a standard T1 transmission line. In addition one or more RPs 50 may communicate with the RPC 30 over a DS1 interface, a high bit-rate subscriber line (HDSL) interface, or T1 interface methods.

Additionally, in a preferred embodiment the RP 50–RPC 30 interface may be a microwave, optical, or cable television line interface. In one embodiment the RPs 50 may be configured to utilize existing CATV cabling for RP 50–RPC 30 communication (or RP to RP communications in alternative embodiments discussed herein). Existing unused bandwidth in the return band of the frequency division multiplexed television signals may be used on the CATV cabling. The CATV downstream and upstream signals are preferably frequency division multiplexed with the RPC to RP data signals and RP 50 to RPC 30 data signals respectively. The cable television return band is approximately 5 to 50 MHz. Both voice and data information may be sent in either direction along any of the RP–RPC (or RP—RP) interfaces. At higher data rates, video telephone calls having both audio and video components may be transmitted along these interfaces.

An RP 50 is less expensive to manufacture and easier to use than a base transceiver system in a cellular network. Typically, an RP 50 is mounted onto an existing telephone pole or the side of a building. RPs 50 do not perform any special per-call processing on signals, such as subscriber registration or authentication, and may therefore be inexpensively produced.

Figure 8:
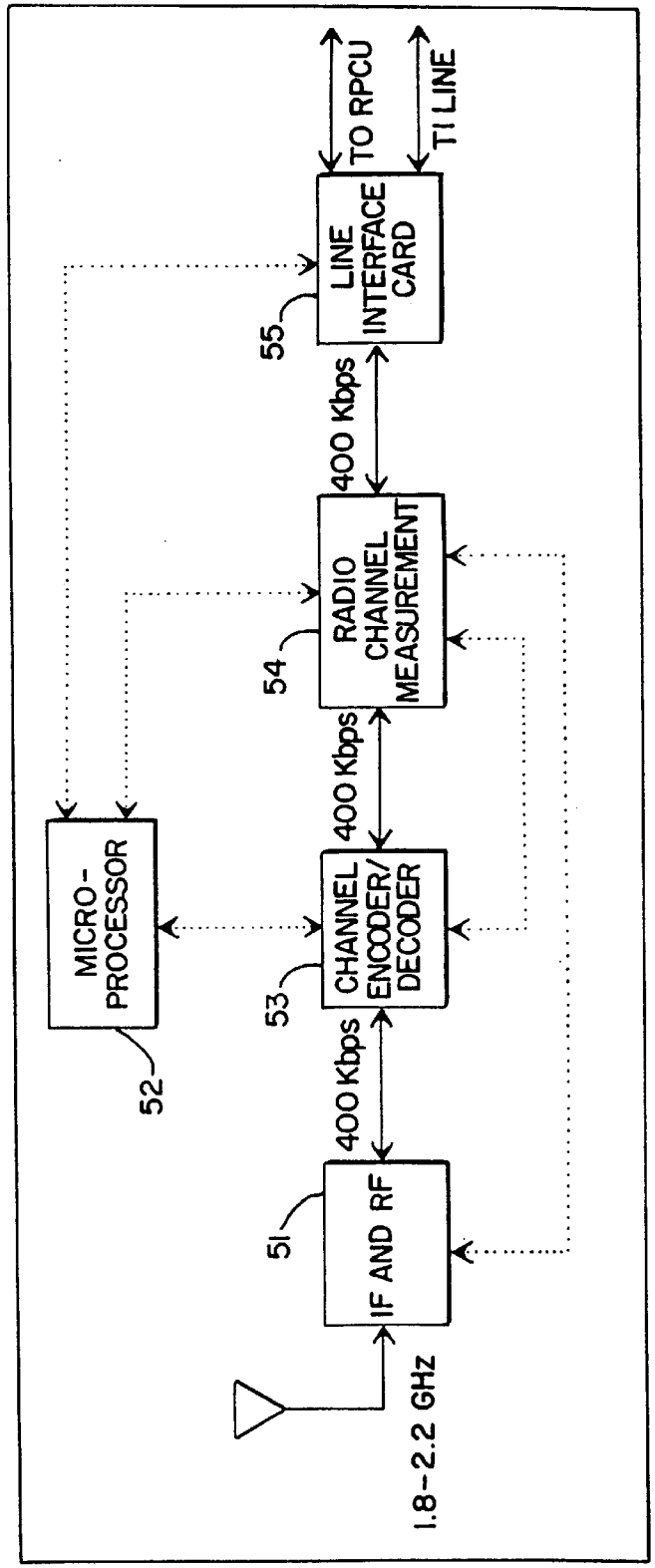
FIG. 8 is a functional block diagram of a radio port.

FIG. 8 best shows a preferred embodiment including a functional block diagram of a basic RP 50. The RP 50 generally performs several functions including: transmission/reception of the radio frequency signals, channel coding/decoding of signals for synchronization with the network, and general performance measurements. The RP 50 contains an IF and RF section 51 receiving and transmitting information signals at RF frequencies over an antenna or antennas. Received RF signals at the IF and RF section 51 are downconverted to a 400 kilobits per second (kbps) data stream and sent to the channel encoder/decoder 53 function block. Although 400 kilobits per second is shown in the preferred embodiment, other data rates are equally suitable, such as 384 Kbps. The channel encoder/decoder 53 function is controlled by a microprocessor 52. The channel encoder/decoder 53 function involves managing the timing of signals arriving and leaving the RP 50. The microprocessor function 52 manages the formation received from an RPC is encoded into 32 kbps ADPCM for transmission to an SU 20.

The standard RP 50 also performs radio channel measurements measuring the performance of SUs 20 and the RP 50. Controlled by the microprocessor 52, the radio channel measurement 54 is made and information is sent to the RPC for processing with each burst Voice and data signals broadcast over a radio link at RF frequencies are received at the RP 50. The RF frequencies are downconverted from the RF frequencies to a 400 kbps data stream in order to recover the information in the signal. The 400 kbps data stream is decoded, processed through a radio channel measurement unit 54 and then sent through a line interface card 55 for transmission over a T1 line connected to an RPC. The decoded information received from an SU 20 and sent on to the T1 line is preferably in a 64 kbps PCM format. Conversely, signals received from the RPC are processed first through a line interface card 55 controlled by a microprocessor 52 and then encoded and converted to RF frequencies for transmission to an SU 20.

Figure 9:
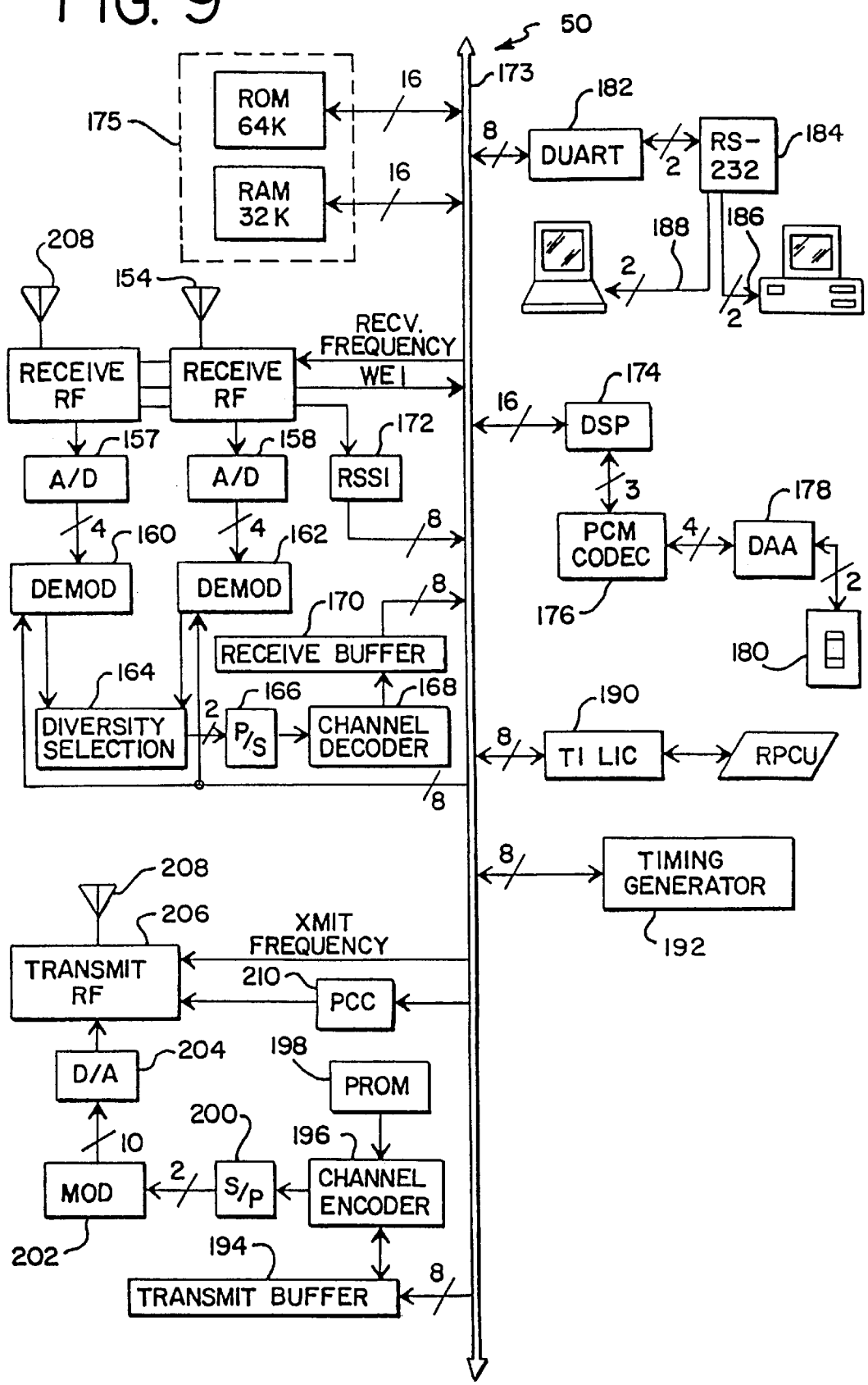
FIG. 9 is a block diagram of a preferred embodiment of the radio port of the present invention.

FIG. 9 illustrates a preferred embodiment of the RP 50 in more detail. The RP 50 receives RF frequency signals from one or more SUs 20 on a pair of spatially diverse antennas 152, 154. The RP 50 is tuned to receive a particular frequency by the digital signal processor 174, such as a TMS320C53. The received signal from the SU 20 is then downconverted in the receive RF sections 155, 156 respectively attached to the spatially diverse antennas 152, 154. Each receive RF section 155, 156 downconverts the same frequency and channels the downconverted signal to an analog-to-digital (A/D) converter 157, 158 respectively attached to the receive RF sections 155, 156. Preferably the A/D converters 157, 158 are 8 bit, 20 Megasample per second A/D converters such as a CXD1175AM-T6 manufactured by Sony Corporation. The digital signals are transferred to modem demodulators 160, 162, which may be implemented as VF4718 chips manufactured by Bellcore Corp. Once the digital signals have been demodulated in the demodulating sections 160, 162 they are compared in a diversity selector 164.

Antenna diversity selection is described in standard WAC/PACS PCS to produce the strongest signal possible in the radio port 50. At the diversity selector 164, preferably implemented with a VF4719 chip made by Bellcore Corp., the different RF downconverted signals demodulated in the demodulators 160, 162 are compared to find the best signal of the two that have been downconverted. Other forms of selection diversity may alternatively be employed such as known ratio combining or equal combining techniques. Ratio combining involves taking the better portions of each signal and combining the two portion to reconstruct the best signal. Equal combining requires taking equal amounts of both signals received on the antennas 152, 154 and combining them. Because the antennas 152, 154 are spatially diverse from one another, the RP 50 is more likely to receive a stronger signal. In a preferred embodiment, the antennas are positioned spatially and angularly diverse and most preferably orthogonal to one another.

In another preferred embodiment, a frequency hopping scheme may be used where the hopping rate is proportional to the frame transmission rate. For a frame rate of 2 ms, a frequency hopping rate of 500 Hz may be used to enhance robustness in reception of RF signals. Each RF frequency involved in frequency hopping is preferably separated by 300 KHz. Such a hopping mechanism also enhances the transmission range of each cell in the wireless PCS system. The above described advantages of frequency hopping may also be realized by an antenna hopping scheme.

Antenna hopping involves transmitting on different antennas to provide increased randomization in the RF signal received by an SU 20. Each RP 50 is programmed to transmit a distinguishable antenna hopping sequence and an antenna hopping code identifying the transmitted sequence. Preferably, a DSP in the SU 20 receives the code and responds to the antenna hopping sequence.

Another preferred embodiment may provide time diversity by interleaving a plurality of frames. Interleaving involves segmenting a digital signal, such as a digitized speech signal, over a predetermined number of message frames. The number of frames interleaved is proportional to the randomization in the received RF signal, but an increased number of frames increases transmission delay. A person skilled in the art may choose the optimal number of frames interleaved for a given application.

Following reception and downconversion of the RF frequencies and diversity selection, the signal is then processed through a parallel-to-serial (P/S) converter 166 and input in serial format to a channel decoder 168. The channel decoder 168 decodes the correlation information. In a preferred embodiment the channel decoder 168 comprises a Xilinx XC4005-6PQ208C chip. Information decoded in the channel decoder 168 is then forwarded to a receive buffer 170 prior to being sent on a databus 173 to a destination determined by the digital signal processor 174. Voice information is transmitted along the databus 173 to the DSP 174. The DSP 174 decodes the 32 kbps ADPCM to 64 kbps PCM. The PCM Codec 176 receives the 64 kbps mu-law PCM and decodes it into an analog signal. The analog signal is then processed in a Data Access Arrangement (DAA) 178 for transmission along telephone lines.

If the information placed onto the databus 173 is data information, the data information is then directed by the DSP 174 to the appropriate dataports 188, 186. The dataports 188, 186 are connected to the databus 173 via a DUART 182 which translates the information into an asynchronous serial input/output form that is then handed to an RS-232 port 184. Alternatively, if the information placed on the databus 173 is intended for processing through a WACS/PACS network, then the information is routed through a T1 transport 190, which may preferably comprise an AT&T 1711SA chip, which interfaces with an RPC 30. In the alternative embodiment mentioned above, where the RP 50 is connected to an RPC (or other RP) via existing CATV lines, the T1 transport 190 is replaced with a transport capable of modulating/demodulating the information up to the 5–50MHz band available on the CATV line.

Voice information received from the telephone lines or the RPC 30 is transferred along the databus 173 to the transmit buffer 194 in preparation for encoding in a channel encoder 196. In a preferred embodiment the channel encoder is a Xilinx XC4005-6PQ208C chip. The encoder 196 is programmed with the algorithm disclosed in the Bellcore specification in firmware installed in a PROM 198. The RP 50 also has a memory block 175 for extra program storage capability. The channel encoder 196 encodes the received 32 kbps ADPCM signal with information regarding timing and synchronization. The encoded ADPCM signal is processed through a serial-to-parallel (S/P) 200 device to configure the signal for modulation in a modulator 202 which then transfers the signal to a digital-to-analog (D/A) converter 204. After conversion to analog form, the modulated signal is then converted to an RF transmission signal in a transmit RF section 206. The RF signal containing the encoded data is then transferred along the transmit antenna 208 to the appropriate SU 20. For transmission of data where no encoding is necessary the encoder 196 and S/P converter 200 are bypassed and the databus 173 is directly connected to the modulator 202. This decision may preferably be controlled by digital signal processor (DSP) 174.

Another feature embodied in the RP 50 is power control in connection with a subscriber unit 20. The radio port 50 collects data on received signal strength using a received signal strength indicator (RSSI) 172. The RSSI 172 is located on the RF receive portion of the RP 50. Also a word error indication bit (WEI) is received from an SU 20 and transferred through the DSP 174 to the RPC 30.

Generally the RP 50 transmits a time division multiplex (TDM) transmission with 8 time slots. The RP 50 uses one of the time slots as a system broadcast channel (SBC) for reference by the SU 20 in synchronizing frames transmitted. Just as the SU 20 transmits into one of the 8 slots in bursts, the RP 50 transmits on all 8 slots. When transmitting, the RP 50 synchronizes with the rest of the system 10 using a timing generator 192 which preferably operates at 400 kilohertz. The timing aspects of the eight slot message 70 transmitted by the RP 50 is important both because information sent from an SU 20 must be synchronized to fit into the proper slot in a frame and because information transmitted to the RP 50 and then onto T1 lines must be synchronous with time slots available and expected by the system 10. As mentioned above, a preferred format for the interface between the RP 50 and the RPC is DS1 over a T1 line. Similar to the time slots in the eight slot message transmitted between SU 20 and RP 50 the T1 line connected to the RPC 30 also has DS1 time slots which must be synchronized with the information.

Referring again to FIG. 5, formatted information transmitted via RF frequencies from the RP 50 to the SU 20 is illustrated. The SBC time slot contains 100 bits as do the other 7 time slots. However, the 64 bit fast channel (FC) in the SBC is unused.

In a preferred embodiment a universal circuit board may be used to construct either a radio port 50 or a subscriber unit 20. Different components may be loaded depending on whether the universal board is to be an RP or an SU (or a hybrid RP/RPC in an alternative embodiment discussed herein). Alternatively, the universal circuit board may have all the functional elements for RP and SU configurations loaded and the specific configuration enabled may be determined by a simple hardware or software switch.

Figure 10:
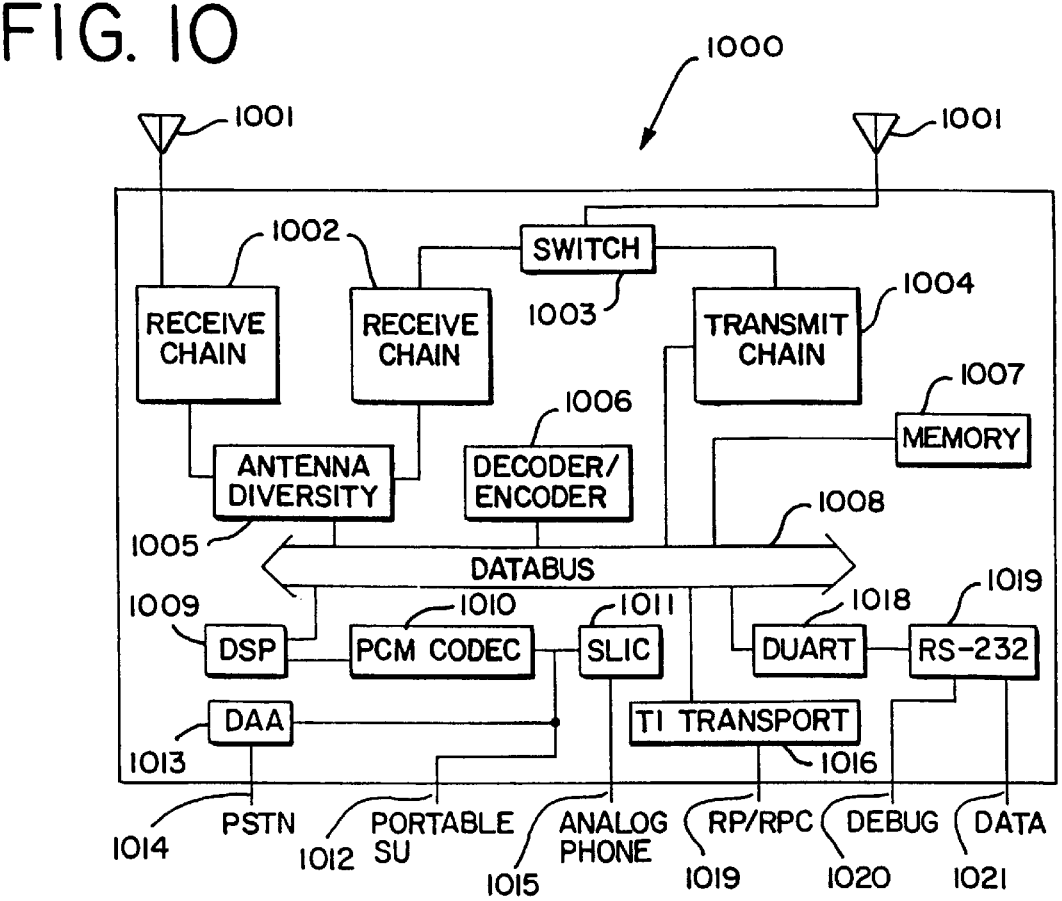
FIG. 10 is a block diagram of a universal circuit board for use in an RP or SU.

As best shown in FIG. 10, the universal board 1000 has two antennas 1001 connected to two receive chains 1002. A transmit chain 1004 is connected to one antenna 1001 through a transmit/receive switch 1003. The two receive chains connect at an antenna diversity selector 1005. The receive chains 1002 and the transmit chain 1004 are linked to a databus 1008. Also linked to the databus are an encoder/decoder 1006, and a memory block 1007. The board further contains a DSP 1009 connected to a PCM codec 1010. The DSP 1009 is also connected to the databus 1008. The PCM codec 1010 connects to a SLIC 1011, a portable SU connector 1012, and a DAA 1013. The DAA 1013 is connected to a PSTN port 1014 and the SLIC 1011 connects to an analog phone jack 1015. A T1 transport 1016 connects to the databus 1008 and to an RP/RPC port 1017. The data bus 1008 is further linked to a DUART 1018 which is, in turn, connected to an RS-232 connector 1019. The connector 1019 is linked to both a debug port 1020 and a data port 1021.

In a preferred embodiment of the universal circuit board 1000, an SU can be created by disconnecting or disabling one receive chain 1002, the DAA 1013, and the TI transport 1016. In addition, the appropriate program for encoding/decoding signal synchronization is placed in the memory 1007. In an alternative embodiment, the encoding/decoding program for both the RP and SU may be loaded into the memory 1007 for later designation by instructions received at the debug port 1020, by a hardware switch on the universal board, or by a decision of the DSP 1009.

Differentiation between a fixed and a portable SU may also be made with the universal board 1000 in a preferred embodiment. By disabling or not connecting a SLIC 1011, in addition to the other changes necessary to create an SU, the board 1000 is suitable for use as a portable SU. A fixed SU is created by enabling or connecting a SLIC 1011 and disabling or disconnecting the portable SU connector 1012.

In another embodiment, the universal circuit board may be configured as an RP. By disabling or disconnecting the SLIC 1011 and the portable SU connector 1012, the universal board 1000 has substantially all the necessary functions to operate as an RP. Further, another preferred embodiment of the universal board 1000 as an RP includes customizing the type of RP required for a specific configuration. For example, an RP that will only be used to directly connect to the PSTN does not need the T1 transport circuitry 1016. Power supply requirements on the universal board 1000 can be met by either including the necessary components or by external power supply circuitry both of which are easily accomplished by one of ordinary skill in the art. The presently preferred embodiment of the universal board 1000 adds flexibility to WACS/PACS PCS system planning and requires fewer parts to be carried in stock for repairs or replacements of system parts.

RADIO PORT CONTROLLER

Another central component in the wireless personal communication system is the radio port controller (RPC) 300. The RPC 300 manages RP resources and controls the transport of information between a network switch 80 and its associated RPs 50.

The RPC 300 interfaces with at least one RP 50 and with at least one switch 80. The RP 50 interface is preferably a DS1 layer 1 interface allowing a 64 kb/s clear channel and a TDM/TDMA layer 2 interface mapping the TDM/TDMA time slots to DS1 channels. The RPC 300 to switch 80 interface is preferably a DS1 physical interface using the ISDN Basic Rate Interface BRI communication protocol defined in the Bellcore specification.

In the basic configuration contemplated by the Bellcore specification, the RPC 300 performs call processing functions and transcodes compressed data into full PCM data and vice-versa. The RPC 300 exchanges signaling information with the SU 20 and collects performance monitoring information (e.g. radio link quality, channel usage, channel allocation, traffic data, and system capacity information).

Figure 11:
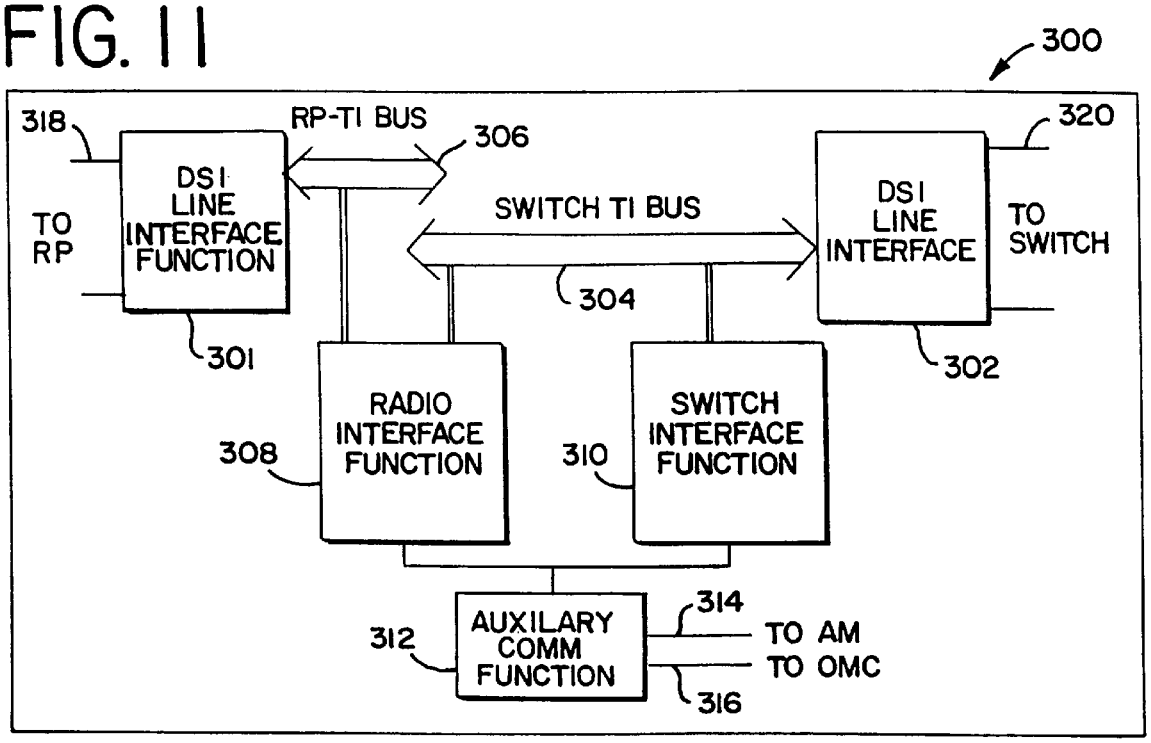
FIG. 11 is a block diagram showing functions to be performed by an RPC.

FIG. 11 is a functional block diagram of a potential embodiment of an RPC 300. The RPC 300 includes an RP DS1 line interface module 301 connected to RPs 50 over RP DS1 communication links 318 and a switch DS1 line interface module 302 connected to the switch 80 over switch DS1 communication links 320. The RPC 300 also includes a radio interface function module 308 in communication with the RP DS1 line interface module 301 through an RP-T1 bus 306 and a switch interface function module 310 in communication with the switch DS1 line interface module 302 through a switch T1 bus 304. The radio interface function module 308 and the switch interface function module 310 are connected to an auxiliary communication function module 312. The auxiliary communication function module 312 is connected to the AM 90, preferably over a first Ethernet TCP/IP interface 314 and is connected to the OMC 70, preferably over a second Ethernet TCP/IP interface 316.

The RP-DS1 line interface function module 301 preferably consists of the physical, mechanical, and electrical functions required to support the 1.544 DS1 lines 318 to the RPs 50. The switch-DS1 line interface function module 302 preferably consists of the physical, mechanical, and electrical functions required to support the 1.544 DS1 lines 320 to the switch 80. The radio interface function module 308 preferably performs the functions of multiplexing and demultiplexing wireless personal communication system (WACS or PACS) traffic and signaling information into the DS0 slots of the DS1 interface to the RP 318. The radio interface function module 308 may also insert unused bits in the RP DS1 interface 318 due to timing differences between the 1.544 DS1 line and the RP 50 time slots. In addition, the radio interface function module 308 generates a TDM/TDMA synchronization pattern for the RP DS1 interface 318. The radio interface function module 308 also transcodes compressed digitized speech into mu-law PCM speech and transcodes mu-law PCM speech into compressed digitized speech. Currently, the RPC 300 compresses speech using 32 kb/s ADPCM encoding; however, other compression schemes may be used such as 16 kb/s LDCELP or ADPCM type compression. Also, although mu-law PCM is used for uncompressed speech, other digital representations of speech may be used such as A-law PCM.

The radio interface function module 308 performs error checking of wireless personal communication system layer 2 information preferably using a 16-bit checksum, and processes radio link quality measurements such as word error indication bits and co-channel interference codes received from the RP 50 over the RP DS1 interface 318. The radio interface function module 308 also processes layer 2 wireless personal communication system signaling messages. In addition, the radio interface 308 maintains TDM/TDMA timeslot status information such as busy/idle and per-call information for each active call. Finally, the radio interface 308 multiplexes alerting channel and system information channel information based on priority onto a system broadcast channel that is sent over the RP DS1 communication link 318.

The switch interface function module 310 performs the signaling functions required to interface to the switch. More specifically, the switch interface module 310 receives and transmits call processing messages to the switch. In a preferred embodiment the communication protocol to the switch over the DS1 interface 320 is the ISDN basic rate interface (BRI) and the switch interface function module receives, transmits, and processes ISDN communication messages. However, the interface 320 may be any other digital communication method such as ISDN primary rate interface (PRI) or an optical interface such as SONET. The switch interface function module 310 also interfaces with the auxiliary communication function module 312 performing incoming call processing and OMC functions. The switch interface function module 310 communicates with the radio interface function module 308 using the switch T1 bus 304 when processing outgoing calls.

The auxiliary communication function module 312 coordinates activities of various RPs 50 such as by maintaining per-RP information including e.g. "up/down" status, radio link quality, channel usage data, and traffic statistics. The auxiliary communication function module 312 routes calls from the switch 80 to the proper RP 50. The auxiliary module 312 also sends, receives, and processes layer 3 wireless personal communication messages to and from the AM 90 using the first Ethernet TCP/IP interface 314. The auxiliary module 312 interfaces to the OMC 70 over the second Ethernet interface 316 to monitor and control a software downline load function such as when a new version of software may be downloaded to a component of the system. Such downloading is particularly useful for updating software in the SU 20.

Figure 12:
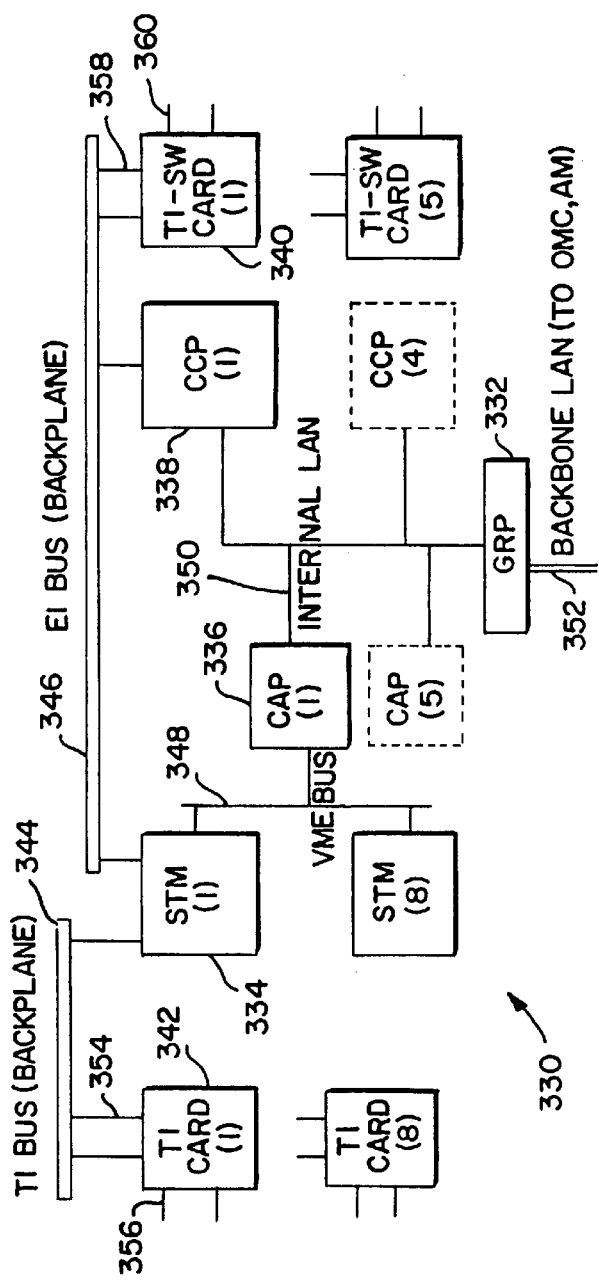
FIG. 12 is a block diagram illustrating one preferred embodiment of an RPC.

FIG. 12 shows a component block diagram of a preferred embodiment of an RPC 330 according to the present invention. The RPC 330 processor (GRP) 332, source processor (GRP) 332, a switching transcoder module (STM) 334, a common access processor (CAP) 336, and a call control processor (CCP) 338. The RPC 330 also includes a T1 bus backplane 344 and an E1 bus backplane 346. The T1 bus 344 interfaces to a T1 card 342. The T1 card 342 can support up to two T1 lines 356, each interfacing with the RP 50. The T1 card 342 communicates with the T1 bus 344 over a T1 bus slot 354. Similarly, a T1 switch card 340 in communication with the switch over two T1 lines 360 fits into a slot 358 in the E1 bus backplane 346. The RP T1 card 342 may be installed in slots 1, 3, 5, 7 providing up to 8 T1 lines to the RPs 50. The switch side T1 cards 340 may be installed preferably in slots 9, 10, 11, 12, 13 of the E1 bus backplane 346 providing up to 10 T1 lines 360 to the switch.

The GRP 332 communicates over a backbone LAN 352 to the OMC 70 and to the AM 90. The GRP 332 also communicates with at least one CAP 336 and at least one CCP 338 over an internal LAN 350. The GRP 332 provides access to the external backbone LAN 352 and performs network management and other centralized RPC 330 functions. Each CAP 336 communicates with preferably up to 8 STMs 334 over a high speed VME bus 348. Each STM 334 is connected to both the T1 bus 344 and the E1 bus 346. Also, each CCP 338 is connected to the E1 bus 346.

As shown in FIG. 12 there may be as many as 5 CAPs 336, and as many as 4 CCPs 338 in the RPC 330. Although FIG. 12 shows a specific number of each component the present invention is not limited to a specific number of components. Specifically, the present invention is designed support additional components such as extra GRPs 332, CCPs 338, CAPs 336 and STMs 334.

In addition, as more processors are added, additional T1 cards 342 and T1 switch cards 340 may also be added. Also, it should be noted that the E1 bus 346 may also support E1 cards as well as T1 cards 349 for use in countries other than the United States such as in Europe. In a preferred embodiment, a backplane associated with the E1 bus 346 has a plurality of slots and each slot is adapted to receive either a T1 or an E1 card. The slot electrically connects the T1 bus and the E1 bus to the inserted card (T1 or E1), preferably using a single universal connector. In one embodiment, a manual switch connected to the backplane allows a user to manually select the card type and the associated bus, T1 or E1. Alternatively, the type of card, T1 or E1, supported by each slot may be configured in software instead of using the manual switch.

Each STM 334 receives and transmits wireless personal communication system interface frames to and from an RP 50 via one T1 line 356 and the T1 backplane bus 344. Preferably, one STM 334 is used to handle one T1 line 356 to the RP 50. Each STM 334 also receives and transmits speech data to and from the switch on DS0 slots on any of the T1 lines 360 connected to the E1 backplane bus 346.

The CAP 336 provides interrupt timing to the STMs 334 and sends commands to the STMs 334 over the VME bus 348. The VME bus 348 allows the CAP 336 to directly access, read or write the local memory within each STM 334. The CAP 336 can also access the backplane T1 bus 344. The CAP 336 communicates with the CCP 338 and the GRP 352 over the internal LAN 350.

The CAP 336 includes a common processor module (CPM) containing a processor such as an INTEL 960 processor including associated circuitry and a communication chip interface such as the AT&T SPYDER chip. The common processor communicates with either the T1 bus 344, the E1 bus 346, the LAN 359, or the VME bus 348.

Each CAP 336 manages and maintains radio links for up to 8 STMs 334. Each CAP 336 maintains information such as STM numbers, radio port IDs, RF carriers and TDM/TDMA time slots used by the radio link as well as the radio link status. Each CAP 336 generates STM 334 synchronization interrupts and forwards wireless personal communication system layer 3 messages received from the STM 334 to the CCP 338 and sends messages from the CCP 338 to the STM 334. The CAP 336 also processes wireless personal communication system layer 2 messages except the acknowledge mode transfer messages that are handled by the STM 334.

The CCP 338 provides an ISDN interface to the switch. The CCP 338 performs switch interface processing including ISDN D-channel signal processing and multiplexing/demultiplexing of multiple D channels from the switch side T1 line 360. The CCP 338 accesses time slots on the backplane E1 bus 346 containing ISDN channel signaling information received from the switch via a communication module, such as an AT&T SPYDER chip. The CCP 338 also performs wireless personal communication system layer 3 processing including call origination, call delivery, call disconnect and anchor ALT processing as well as the exchange of messages with the CAP 336 and the GRP 332 in support of layer 3 processing.

The GRP 332 provides RPC 330 centralized functions such as network management, OMC interfacing, set up and management of TCP/IP connections to the access manager AM, wireless access communication system layer 3 registration message processing, and load balancing between multiple CCPs 338 and CAPs 336.

Figure 13:
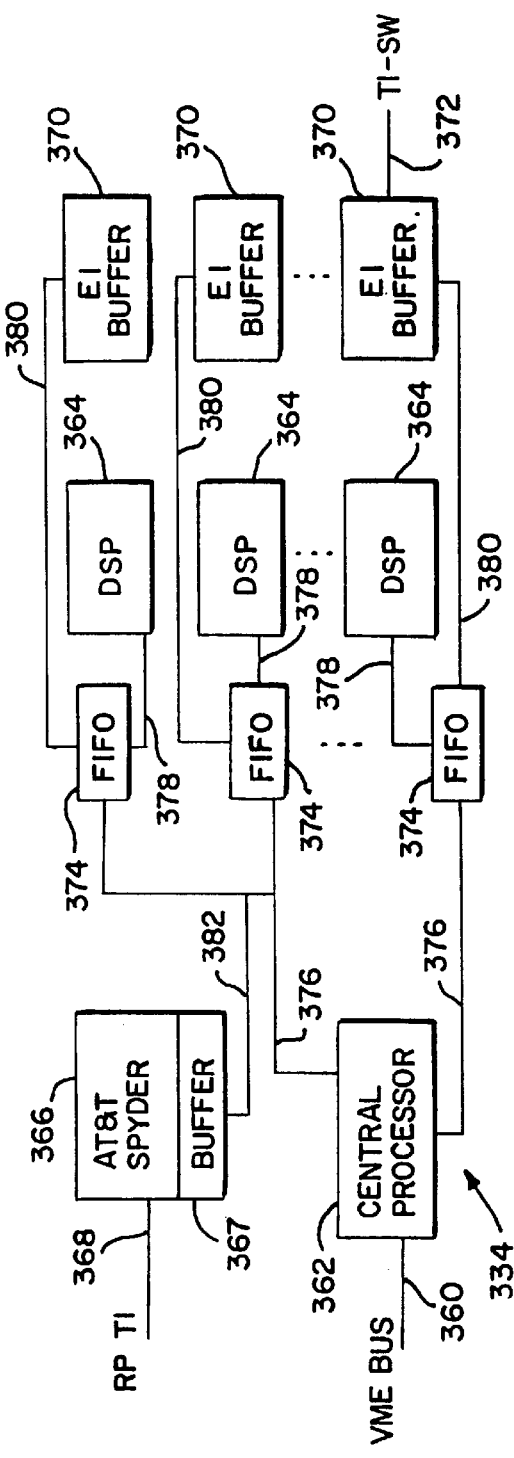
FIG. 13 is a block diagram of one preferred embodiment of an STM that may be used within the RPC of FIG. 12.

As shown in FIG. 13, the STM 334 contains one central processor (CP) 362 such as an INTEL 960 processor and 12 digital signal processors (DSP)s 364 such as Texas Instruments C30DSP processors in the preferred embodiment. The STM 334 also has an E1 buffer 370 for communicating with the switch 80, and a communication processor such as an AT&T SPYDER chip for communicating with the RPs 50.

The E1 buffer 370 includes an input buffer having the same length, preferably 320 bytes, as an output buffer. The E1 buffer 370 contains a forward slot location pointer (FSLP) for determining the current position in the E1 buffer 370 for transmitting and receiving data. The FSLP may be a register containing the offset into the buffer 370 of the current byte being received or transmitted.

The SPYDER communication processor 366 is preferably configured so that a DS1 frame is divided into two superchannels. Each superchannel carries 12 bytes of a wireless personal communication system payload group. A payload group consists of 1680 bits (16 bursts, each burst having 105 bits) of data from the RP 50. For both transmit and receive, a buffer 367 configured for the SPYDER for each superchannel, consists of 16 circularly linked blocks having 12 bytes each. The buffer size matches the size of the RP time slot and the number of buffers match the size of the payload group. This configuration allows efficient synchronization to the payload group in addition to efficient manipulation of RP 50 time slot data.

The DSPs 364 provide speech transcoding such as ADPCM to PCM or LDCELP to PCM as well as wireless personal communication system layer 2 message processing. The DSPs 364 communicate with the CP 362 via an internal FIFO 378 mechanism. The CP 362 communicates with the CAP module 336 via the backplane VME bus 348 and also communicates via the internal LAN 350 during downloading and debugging.

A pair of DSPs 364 within each STM 334, one DSP 364 for processing receive slots from the RP side and the other DSP 364 for processing receive slots from the switch side T1 360, is allocated for each call. The CP 362 assigns each of the DSPs 364 into pairs where one DSP 364 is a Rx DSP 364 and the other is a Tx DSP 364. Each DSP 364 pair converts ADPCM speech from the RP side T1 line 356 to PCM speech sent to the switch side T1 line 360 as well as compresses PCM speech from the switch to ADPCM speech sent to the RP 50.

The pair of DSPs 364 also perform wireless personal communication system layer 2 acknowledge mode transfer processing. This processing involves splitting and recombining layer 3 messages into multiple layer 2 segments; maintaining sequence number, checksum, and acknowledgment data; and retransmitting layer 2 messages. The pair of DSPs 364 also perform RP signal quality measurements such as RSSI measurements. The pair of DSPs 364 process the RSSI values received from the RP 50 over the T1 line 356 and provides the best RP timeslot information to the CP 362.

The CP 362 receives wireless personal communication system messages from the RP 50 and distributes data to the pair of DSPs 364. The CP 362 also receives PCM speech from the switch and distributes the data to the pair of DSPs 364 handling the call. The CP 362 synchronizes wireless personal communication system messages on the RP side and performs wireless personal communication system layer 2 and layer 3 message forwarding between the CAP 336 and the pair of DSPs 364. The CP 362 also marks the next available slot for a call to the RP using RSSI information received from the DSPs 364. Finally the CP 362 processes anchor time slot interchange information.

Figure 14:
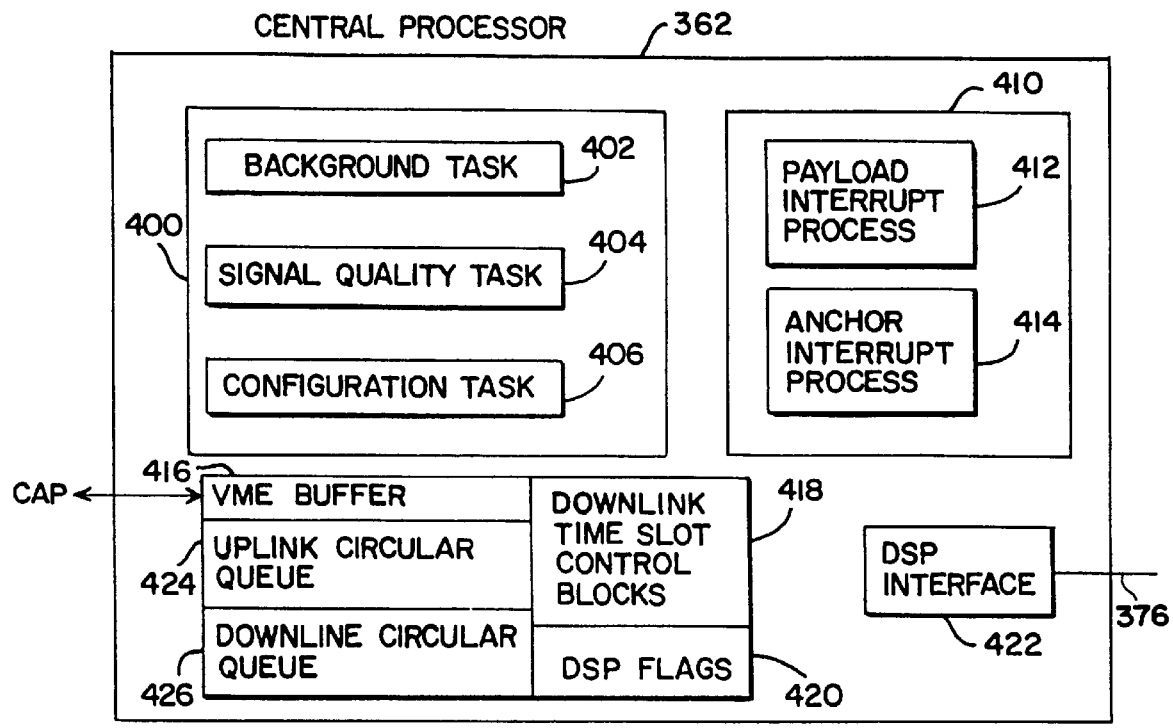
FIG. 14 is a block diagram of a central processor that may be used in the STM of FIG. 13.

As shown in FIG. 14, the CP 362 in the STM 334, preferably contains a background process 400, an interrupt process 410, a DSP interface 422, and various memory components. The memory components include data structures such as the VME buffer 416, the time slot control blocks 418, the uplink circular queue 424, the downlink circular queue 426, and the DSP flags 420. The VME buffer 416 is connected to the VME BUS 348 and allows communication between the STM 334 and the CAP 336. The time slot control blocks 418 preferably include 16 blocks grouped into an array with one block for each RP T1 368 time slot. The time slot control blocks 418 contain all the information required by a payload interrupt process 412 to process voice and layer 2 messages related to each time slot in the RP T1 line 368. The DSP flags 420 include an array of state flags, one for each DSP 364. In the preferred embodiment there are 12 DSPs so the array contains 12 DSP flag entries. Each flag entry is used to mark whether a DSP 364 is available for use by the payload interrupt process 412.

The interrupt process 410 performs all time critical processing including building a wireless personal communication system payload envelope and determining which time slot to mark as available. The background process 400 performs non-time-critical functions required by the STM 334.

In a preferred embodiment, the background process 400 consists of the background task 402, the signal quality task 404, and the configuration task 406. The background task 402 preferably performs the following functions: sending health check messages to the controlling CAP 336, checking the health of the DSPs 364 and reloading DSPs 364 reporting a large number of errors, monitoring and, if necessary, resetting the E1 hardware such as the E1 bus 346, processing commands received from the CAP 336, and monitoring STM 334 alarm conditions. STM 334 alarm conditions may include loss of T1 clock, loss of or unstable CAP 336 interrupt, STM 334 to CAP 336 interface failure, DSP 364 failure, loss of synchronization at the RP T1 368, and E1 buffer 370 memory failure.

The signal quality task 404 periodically processes RP 50 signal quality measurement data such as RSSI data received from the DSP 364 and uses the signal quality data to mark the next best time slot available in the time slot control block 418. Preferably, the configuration task 406 is responsible for processing STM 334 configuration messages received from the CAP 336 during STM 334 initialization and reconfiguration. A more detailed description of hardware initialization and configuration may be found in U.S. Pat. No. 5,299,198, the entire disclosure to be incorporated by reference herein.

The interrupt process 410 includes the wireless personal communication system payload interrupt process 412 and an anchor interrupt process 414. The payload interrupt process 412 is controlled by a control interrupt, preferably 500 micro seconds in duration, generated by the CAP 336.

In a preferred embodiment, the payload interrupt process 412 periodically performs the following functions: voice processing, next available slot marking, wireless personal communication system layer 2 and 3 processing, and setting the time slot control block 418 active upon receipt of a busy time slot indication. Voice processing involves moving data from the E1 input buffer 370 to the DSP 364 for compression, such as ADPCM compression, and then moving the compressed data to the transmit buffer 367 for output to the RP T1 line 368. Voice processing also includes receiving voice data from the receive buffer 367 and decompressing the data to PCM data and placing the PCM data into the E1 output buffer 370.

Layer 2 and 3 message processing involves processing both uplink and downlink messages. For the uplink, a message received from the SU 20 is inserted into the uplink time slot circular queue 424. For the downlink, a message from the CAP 336 is inserted into the downlink time slot circular queue 426 indicating the message is available for transmission over the RP T1 line 368.

Preferably, the anchor interrupt process 414 is enabled when the STM 334 is configured for anchor mode. The anchor interrupt routine 414 preferably moves data from the E1 input buffer 370 for a particular DS0 slot of the T1 line 372 to the E1 output buffer 370 effectively looping data from the switch.

The DSP interface module 422 may communicate with the DSPs 364 using the FIFO 374. The DSP interface 422 may send and receives formatted messages to the DSPs 364 over a FIFO data bus 376 by reading and writing data. When a command is sent to the DSP 364 it may also be written into the FIFO 374. The CP 362 then issues an interrupt to the DSP 364, and the DSP 364 preferably processes the command and inserts a response back into the bidirectional FIFO 374. Each response from the DSP 364 contains a response status code. In a preferred embodiment the following response status codes are available: no error (0x00), PCM data returned (0x01), wireless personal communication system payload returned (0x02), layer 2 message returned (0x03), layer 3 message returned (0x04), INFO$_{13}$ ACK being processed (0x05), layer 3 message segment in response (0x06), layer 3 message acknowledged (0x07), error (0xff). Each response from the DSP 364 also contains a NR/TR status field containing the status of DSP 364 timer (TRxxx) and counter (NRxxx) parameters. The NR/TR status field is bit mapped with each bit set to 1 if the NRxxx counter value has been exceeded or the TRxxx timer has expired. In the preferred embodiment the NR/TR status field includes: bit 0 - TR216 timer, bit 1 - TR217 timer, bit 2 - TR218 timer, bit 3 -NR210 count, bit 4 - NR211 count, bit 5 - NR212 count, and bit 6 - NR213 count.

Each CP 362 to DSP 364 command or response includes a time slot number corresponding to the RP T1 368 time slot being processed. Time slots 0 to 7 are allocated to the first frequency in the wireless personal communication system payload group and 8 to 15 are allocated to the second frequency in the payload group.

Some of the CP 362 to DSP 364 commands or responses includes an SC type field and an SC data field that is dependent on the SC type field. Preferably, the SC type fields include the following types: system broadcast (0x00) —the SC data field contains the available bandwidth, available channel (0x01)—the SC data field contains the available bandwidth, busy channel with CCIC (0x02)—the SC data field contains the CCIC, busy channel with MC-S (0x03)— SC data field contains the 4 bit segment of the MC-S, and busy channel with SDC (0x04)—SC data field contains 4 bit directive of the SDC.

Figure 15:
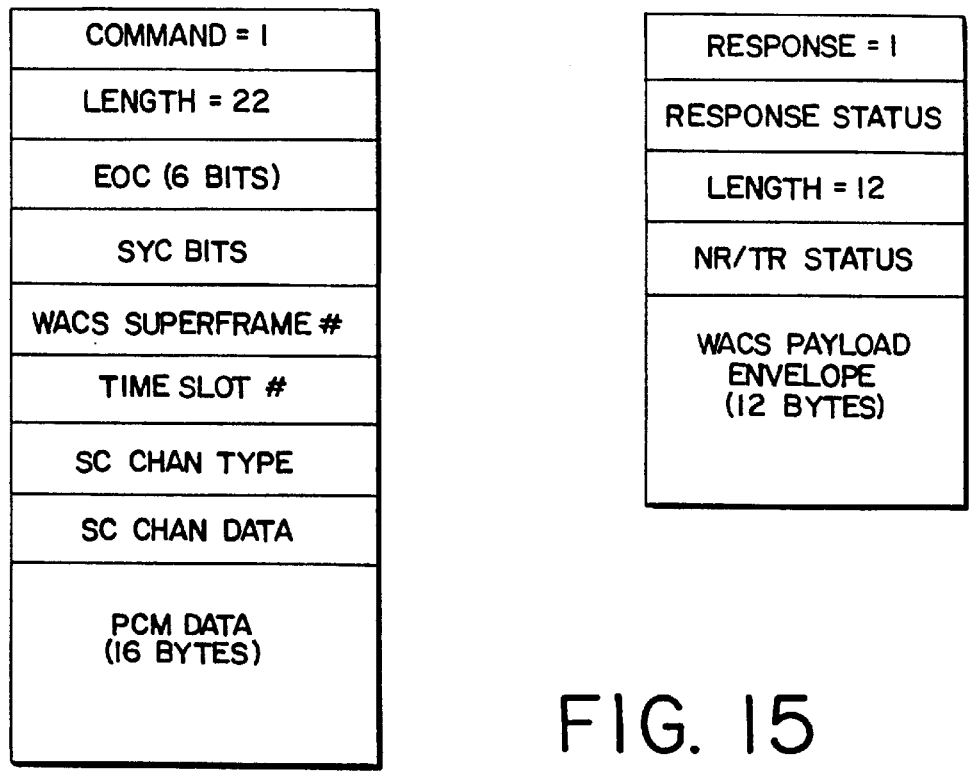

In a preferred embodiment, the following CP 362 commands and DSP 364 responses may be supported: ADPCM compression, payload processing, layer 2 message building, layer 3 message building, DSP configuration, link deactivation, and layer 3 polling. As shown in FIG. 15, the ADPCM compress command has octet aligned fields containing 16 bytes of PCM voice data. The ADPCM command also includes a length field containing the number of following bytes in the command, an embedded operations channel EOC field, SYC bits, a wireless personal communication system superframe number, the time slot number, the SC channel type, and the SC channel data. The ADPCM response contains a 12 byte payload envelope built by the DSP 364 as well as the response status field, the length field, and the NR/TR status field.

As shown in FIG. 16, the process payload command preferably contain the payload envelope to be processed. The response contains a data field that may be PCM data, a layer 2 message, a layer 3 message, or may be empty if a layer 3 message is pending. The response also includes the EOC, the signal quality RSSI value, the quality indicator (QI), the word error index (WER), the wireless superframe number, the time slot, and the SC channel type and data.

As shown in FIG. 17, the build layer 2 message command preferably contains a layer 2 message. The response includes the payload envelope containing the layer 2 message.

Figure 18:
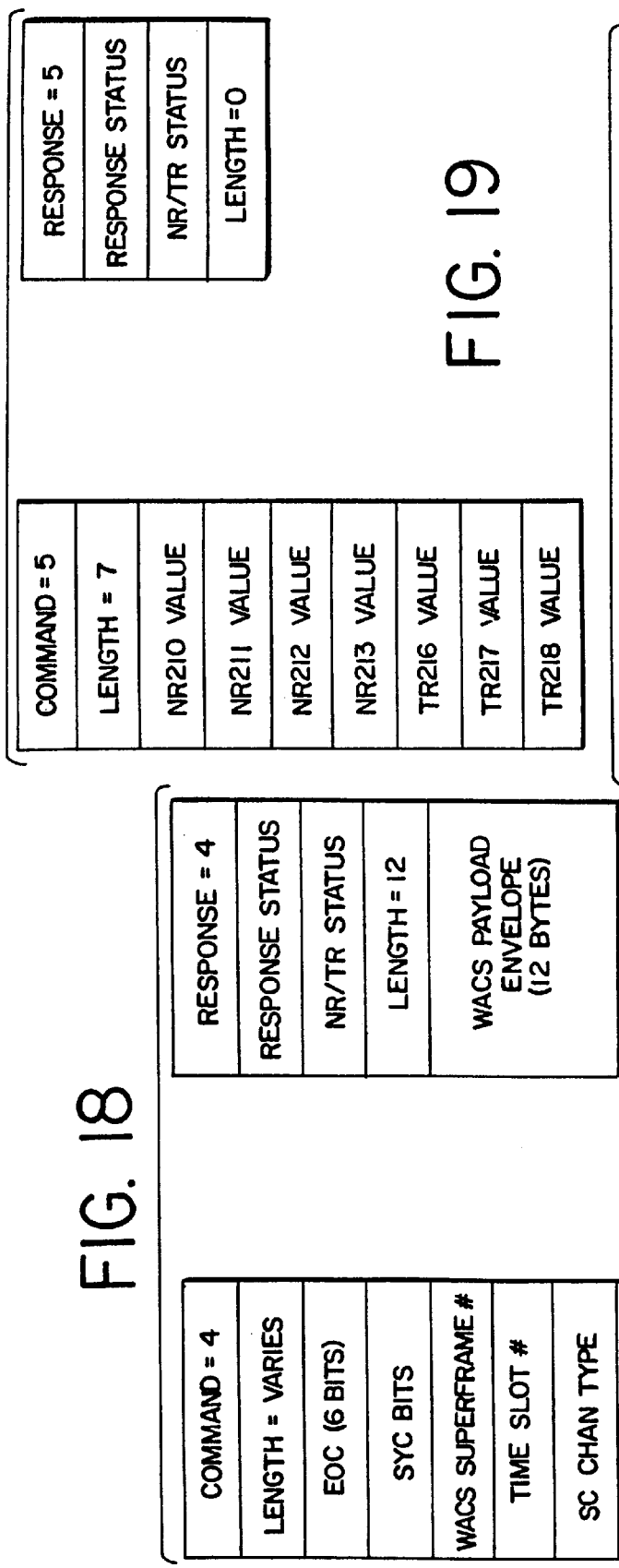

As shown in FIG. 18, the build layer 3 message command preferably includes a layer 3 message to be built into multiple payloads. The command may include a payload containing a portion of the layer 3 message. Subsequent commands sent to the DSP 364 result in a response including payloads containing further segments of the layer 3 message and a status of layer 3 message pending until the entire layer 3 message has been sent to the RP 50.

Figure 19:
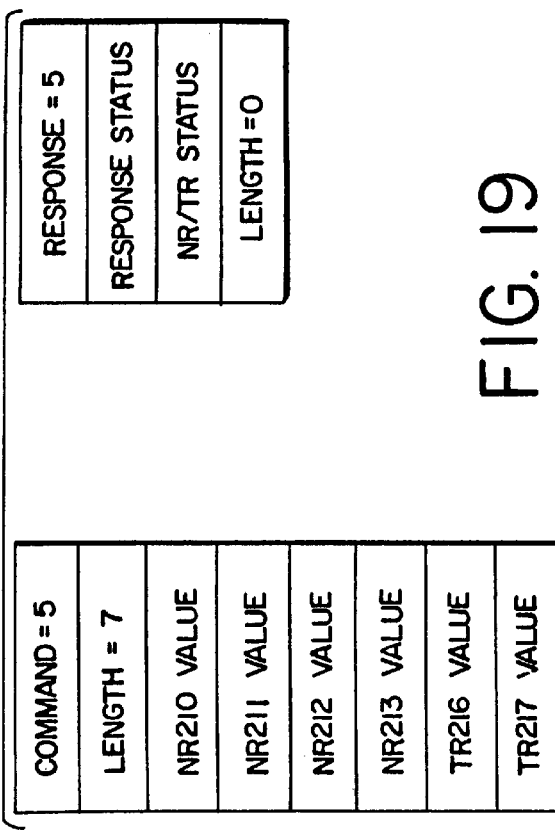

As shown in FIG. 19, the configure DSP command preferably loads the NRxxx and TRxxx parameters into the DSP 364.

The deactivate link command (not shown) causes the DSP 364 to stop any protocol processing and to reset its sequence numbers for the given time slot.

Figure 20:
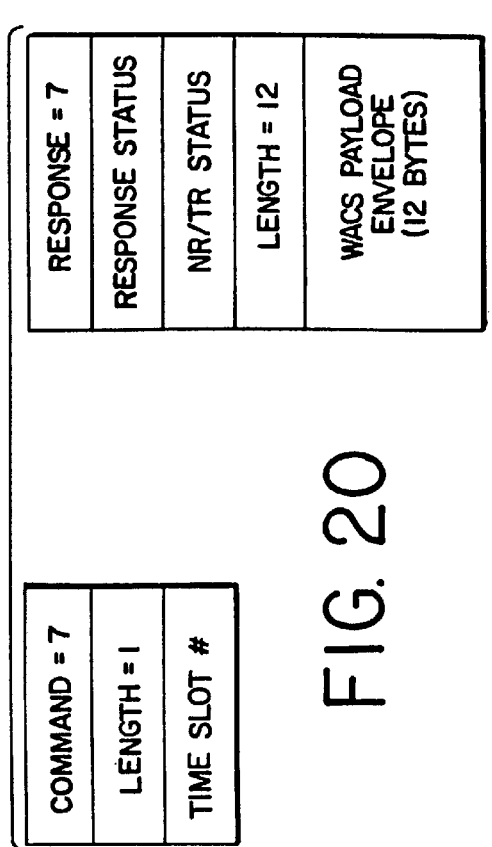

As shown in FIG. 20, a layer 3 polling command may poll the DSP 364 for a layer 3 acknowledgement message from the SU 20. When the CP 362 sends a layer 3 message to the DSP 364, the CP 362 preferably polls the DSP 364 until receiving a response having a response status of "layer 3 message received" indicating that the SU 20 has acknowledged receiving the layer 3 message. When the response indicates that the SU 20 has acknowledged receiving the layer 3 message, the length field in the response is zero and the response does not contain a payload envelope.

Figures 21, 22:
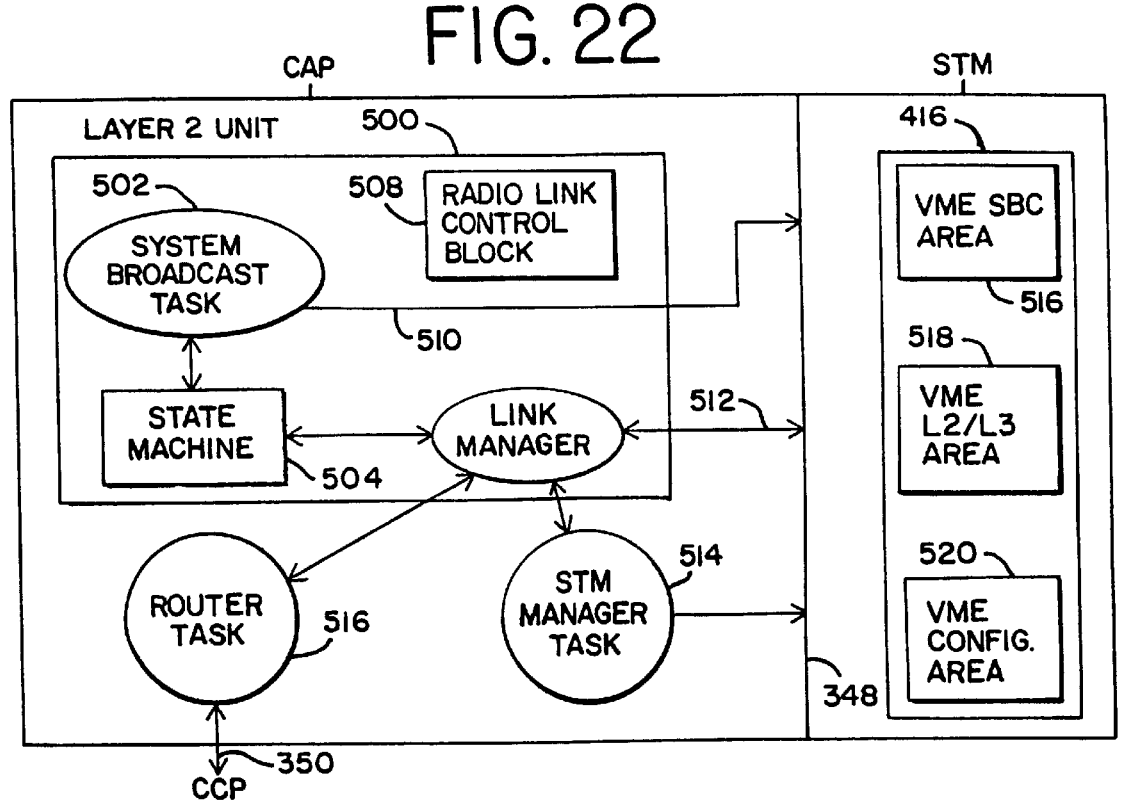
FIG. 21 is a preferred DSP assignment table in the central processor of FIG. 14.
FIG. 22 is a block diagram of a CAP which may be used within an RPC.

FIG. 21 shows how DSPs 364 may be allocated by the CP 362 for processing the individual payload envelopes in a payload group. The letter "a" is the first RF frequency in the payload group. As shown, the DSPs 364 are grouped into pairs, one transmitting DSP and one receiving DSP. The DSPs 364 are grouped into pairs so that signalling for $ACK_{13}$ $MODE_{13}$ TRANS and $INFO_{13}$ ACK message processing can occur using a dual port shared RAM between the pair of DSPs 364. Although FIG. 11 only shows allocation of DSPs 364 for a single RF frequency, other allocations of DSPs 364 are possible for handling multiple RF frequencies.

According to another aspect of the present invention, the STM 334 operates in the following manner. For downlink voice processing, the STM 334 moves voice data from the switch 80 to the SU 20. STM 334 downlink voice processing is initiated by the payload interrupt process 382. After 16 bytes of data has been received into the E1 buffer area 370, the CP 362 composes the 16 bytes of voice data into a compression command sent to a transmit (Tx) DSP 364. The Tx DSP 364 converts the 16 bytes of PCM voice data into ADPCM data and forms a payload envelope containing the compressed data. The payload envelop containing the compressed speech data is then moved into the buffer area 367 for transmission over the RP T1 line 368.

STM 334 uplink voice processing requires the STM 334 to move voice data from the SU 20 to the switch. When a payload envelope has been received in the buffer area 367 and a DSP 364 allocated to the time slot is available, the CP 362 payload interrupt process 382 formats the received data into a DSP process payload command and sends the command to the Rx DSP 364. The DSP 364 then converts the ADPCM speech from the received payload into 16 bytes of PCM speech. The PCM speech is then moved from the FIFO 374 to the E1 buffer area 370 for transmission to the switch.

STM 334 downlink message processing involves moving layer 2 messages from the CAP 336 to the SU 20. The CP 362 moves the layer 2 message from the VME buffer 386 to the Tx DSP 364 using the build layer 2 message command. The Tx DSP 364 responds to the build layer 2 message with a payload containing the layer 2 message. The payload containing the layer 2 message is then moved to the buffer area 367 for transmission over the T1 line 368.

STM 334 uplink message processing involves processing a message received from the SU 20. The payload envelope containing the message is passed to an available DSP 364. The DSP 364 responds to the CP 362 with the layer 2 message that is then inserted into the uplink circular queue 424 in the CP 362 where the message can be retrieved by the CAP 336 for further processing.

STM 334 anchor processing involves looping all received data from the E1 input buffer 370 to the E1 output buffer 370 for a designated time slot. Anchor processing is done by the CP 362 using the anchor interrupt process 384.

As shown in FIG. 22, the CAP 336 preferably includes various processing and data elements. In a particularly preferred embodiment, the CAP 336 includes a wireless personal communication system layer 2 unit 500 which includes a system broadcast task 502, a wireless personal communication system link manager 506, a wireless personal communication system layer 2 state machine 504, and a radio link control block 508.

The system broadcast task 502 may have three message cues. An alert channel cue system, system information channel cue and priority request channel cue. The system broadcast task 502 preferably formulates a system broadcast channel (SBC) Superframe 510 from the three message cues which is sent to the STM 334. Within the STM, the SBC Superframe may be received in a VME SBC area 516 of the VME buffer 416. The system broadcast task 502 is preferably awakened every 1.02 seconds since the SBC Superframe 510 has a period of 1.024 seconds. The system broadcast task 502 may also communicate with the state machine 504.

The link manager 506 communicates with a router task 516 via messages from the CCP 338 over the internal LAN 350 and sends and receives layer 2 and 3 messages to the STM 334. The link manager 506 also sends link commands to an STM manager task 514 in communication with the STM 334. The VME buffer 416 has a layer 2 and layer 3 area 518 and a configuration area 520 for receiving and sending messages to the link manager 506 and the STM manager task 514. The link manager 506 also communicates with the state machine 504. The link manager 506 is responsible for establishing and maintaining radio links. The link manager 506 receives and processes CCP layer 3 messages and forwards any alert commands received from the CCP to the system broadcast task 502.

Messages sent to the STM 334 from the link manager 506 include header information such as the STM slot number, payload group number, time slot number (0/15), and message type (layer 2 or layer 3). The STM slot number, paid load group number and time slot number constitute a radio link identifier RLID used to identify messages for active links. The radio link control block RLCB 508 contains an entry for each radio link. Each link is identified by the associated STM slot number, payload group number and time slot number. The RLCB 508 contains the following fields: RLID, assigned STM chassis number, assigned time slot number and current state.

The STM manager task 514 monitors and controls every STM 334 associated with the CAP 336. The STM manager 514 performs the functions of initializing the STM monitoring the STM 334 for alarms and failures, verifying software in each STM 334, reconstructing data structures from the STM 334 in the event of a failure, and providing utilities and writing commands over the VME bus 348.

The state machine 504 in the preferred embodiment has been implemented as a layer 2 state table that is shown in Table A below. Processing within the state machine 504 is preferably performed as directed by the state table. The state table includes various procedures described in detail below.

TABLE A

WACS/PACS Layer 2 State Table

| Events | Null State | Initial Access Pending | Link Up | Link Suspend | ALT In Progress | Anchored |
|---|---|---|---|---|---|---|
| Initial Access Req. | SO0 | | | | | |
| Initial Access Cnf | | SO1 | | | | |
| Initial Access Deny | | SO2 | | | | |
| L3 Message | | | SO1 | | | |
| Link Suspend | | | SO3 | | | |
| Link Resume | | | | SO8 | | |
| Access Release | | | SO9 | SO9 | | |
| ALT Request | SO4 | | | | SO4 | SO4 |
| ALT Complete | | | | | SO5 | |
| ALT Deny | | | | | SO1 | |
| ALT Exec | | | | | S10 | |
| ALT Ack | | | | | S10 | |
| Set Anchor | | | | | SO6 | |
| Release Anchor | | | | | | SO7 |
| Set Link | | | SO1 | | | |
| Release Link | | | SO1 | | | |

WACS State Procedures

State Procedures SO0

This state procedure performs the following when an Initial Access Request is received in Null State.

1. Set the current state to Initial Access Pending.

State Procedure SO2

1. Set the current state to Link Up.

State Procedure SO2

This state procedure performs the following.

1. If anchor channel is allocated then activate voice channel on the anchor channel.
2. Deallocates all link resources.
3. Set the current state to the Null State.

State Procedure SO3

This state procedure performs the following when a Link Suspend is received in the Link Up State.

1. Set the current state to Link Suspend State.
2. Forward LINK$_{13}$ SUSPEND to CCP.
3. Send Mute command to STM.

State Procedure SO4

This state procedure performs the following when an ALT Request is received in Null State.

1. Set the state to the ALT In Progress.
2. Forward ALT$_{13}$ REQ to CCP.

State Procedure SO5

This state procedure performs the following.

1. If (Intra-ALT) then switch the voice path to the new time slot or STM.
2. Stop TN202.
3. Set the current state to Link Up.
4. Forward ALT$_{13}$ COMP to CCP.

State Procedure SO6

This state procedure performs the following.

1. Set the current state to Anchored.
2. Send command to Anchor STM to anchor a channel.

State Procedure SO7

This state procedure performs the following.

1. Release all call resources.
2. Set current state to Null State.

State Procedure SO8

This state procedure performs the following.

1. Set the current state to Link Up.
2. Forward LINK$_{13}$ RESUME to CCP.

State Procedure SO9

This state procedure performs the following.

1. Set the current state to Null State.
2. Forward ACCESS$_{13}$ RELEASE to CCP.

State Procedure S10

This state procedure sets the current state to ALT In Progress.

Figure 23:
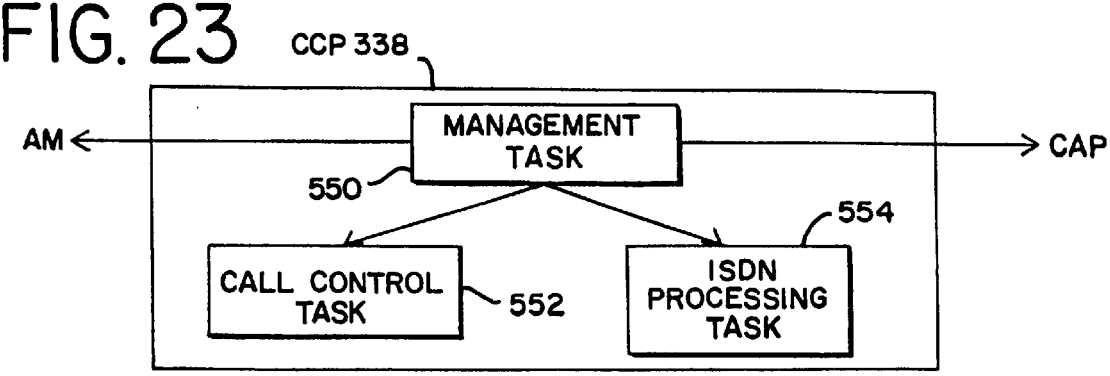
FIG. 23 is a block diagram of a CCP that may be used within an RPC.

As shown in FIG. 23, the CCP 338 includes process components that may be executed on a processor such as an INTEL 960 processor. The CCP 338 is loaded with multi-tasking operating system software such as VXWORKS from Wind River Systems. The process components include a management task 550 that initiates and directs messages between the other components, a call control task 552 that implements a layer 3 wireless personal communication system state machine, and an ISDN processing task 554. The ISDN processing task 554 implements layers 1, 2, and 3 of the ISDN access signaling protocol defined as CCITT standard Q931/Q921 and controls a synchronous protocol data formatter device that communicates with the switch 80 at the central office. The ISDN task 554 is performed by ISDN software available from PGM&S Inc. at 1025 Briggs Road, Suite 100, Mt. Laurel, N.J. 08054.

The management task 550 preferably spawns the other components and routes all incoming and outgoing messages from the AM 90 and the CAP 336. In a preferred embodiment, the call control task 552 has one thread for each active call. Each thread may be an instantiation of the wireless personal communication system layer 3 state machine defined in state event table set forth below. The state machine table defined in below contains many terms defined in the Bellcore specification. Also, persons skilled in the art will recognize that the Intelligent Services Peripheral (ISP) supports the AM 90.

State/Event Table for Layer 3

The following diagram is a legend for the state/event table below.
The list of RPC actions are to be found below in the section labelled "ARPC Actions".
An empty cell in the table signifies that for the given state,
no action is to be taken upon receipt of the given event.

|  | State |
|---|---|
|  | \<State Number\> |
| Event | \<State Name\> |
| Type of Event received by RPC | \<New State that the RPC should enter\> |
|  | \<RPC Action to be executed\> |

STATE

States (read vertically in source):
- 01: NULL
- 02: REGISTERING
- 03: CALL_REQUESTED
- 04: CL_ALREADY (CLALREADY)
- 05: CALL_PROCEEDING (CAPLROCEEDING)
- 06: CRIDASSIGNED
- 07: CALERTED (CEXITS...)
- 08: CACTIVE
- 09: RRESERVED (RREQUEUBTED)
- 10: ALERTED (ALESCCQQ)
- 11: RINGSCRE
- 12: DINGCREN
- 13: TERMINGWNOL
- 14: DROPAPINAS
- 15: DROPAPINIGAKT
- 16: L-AKTAUSTP
- 17: INTRTNDTE
- 18: RIANTEGHED
- 19: RINTEGHEGT
- 20: ACTIVE_CALLATCNOE
- 21: ACTIVE_CALLATRAGT

| EVENT | 01 | 02 | 03 | 04 | 05 | 06 | 07 | 08 | 09 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| WACS_TERM_REG_REQ | 02<br>01 | | | | | | | | | | | | | | | | | | | | |
| WACS_CALL_REQ | 03<br>04 | | | | | | | | | | | | | | | | | | | | |
| WACS_CONNECT | | | | | 08<br>15 | | | | | | | | | | | | | | | | |
| WACS_CONNECT_AGK | | | | | | | | 09<br>09 | | | | | | | | | | | | | |
| WACS_ALERT_ACK | | | | | | | 07<br>11 | | | | | | | | | | | | | | |
| WACS-ALERTING | | | | 06<br>14 | | | | | | | | | | | | | | | | | |
| WACS_REL-COM | | 01<br>33 | 01<br>30 | 15<br>29 | 15<br>29 | | | | | | | | | | 15<br>— | 01<br>26 | | | | | |
| WACS_DISCONNECT | | | | | | | | | | 11<br>17 | 16<br>— | | | | | | | | | 20<br>43 | |
| LINK_SUSPEND | | | | | | | | | | | | | | | | | | | | | 19<br>— |
| ALT_REQ | 19<br>52 | | | | | | | | | | | | | | | | 17<br>50 | | 19<br>57 | 18<br>60 | |
| LINK_RESUME | | | | | | | | | | | | | | | | | 18<br>— | | | | |
| ALT_COMP | | | | | | | | | | | | | | | | | | 09<br>51 | 22<br>62 | 21<br>59 | |
| TERM_REG_ACK | | 02<br>02 | | | | | | | | | | | | | | | | | | | |
| RCID_ASSIGN | | | 04<br>05 | | | 04<br>12 | | | | | | | | | | | | | | | |
| P_ALERT | 10<br>10 | | | | | | | | | | | | | | | | | | | | |
| P_RELEASE | | 02<br>33 | | | | 01<br>31 | | | | 01<br>31 | 13<br>18 | 13<br>19 | | | | | | | | | |
| ISDN_SETUP | | | 04<br>13 | | | | | 07<br>— | | | | | | | | | | 18<br>55 | | | |
| ISDN_ALERTING | | | | 06<br>07 | | | | | | | | | | | | | | | | | |
| ISDN_CALL_PROCEEDING | | | 05<br>06 | | | | | | | | | | | | | | | | 19<br>— | | |

State/Event Table for Layer 3

| Event | S1 | S2 | S3 | S4 | S5 | S6 |
|---|---|---|---|---|---|---|
| ISDN_PROGRESS | 11 17 | | | | | |
| ISDN_CONNECT | | 08 08 | | | 19 56 | |
| ISDN_CONNECT_ACK | | | 09 16 | | 20 57 | |
| ISDN_DISC | | 12 17 | 12 25 | | | |
| ISDN_RELEASE | | | | 14 20 | 01 26 | |
| ISDN_REL_COMP | | | | 14 — | 01 26 | |
| TC3031 EXPIRY | 02 34 | | | | | |
| TR217 EXPIRY | | | 15 65 | | 15 65 | 22 — |
| CALL_RELEASE | | | | | | |
| CALL_RELEASE_REQUEST | | | | | | |
| CALL_RELEASE_COMP | | | | | | |
| TC3111 EXPIRY | | | | 15 21 | 15 21 | |

Figure 24:
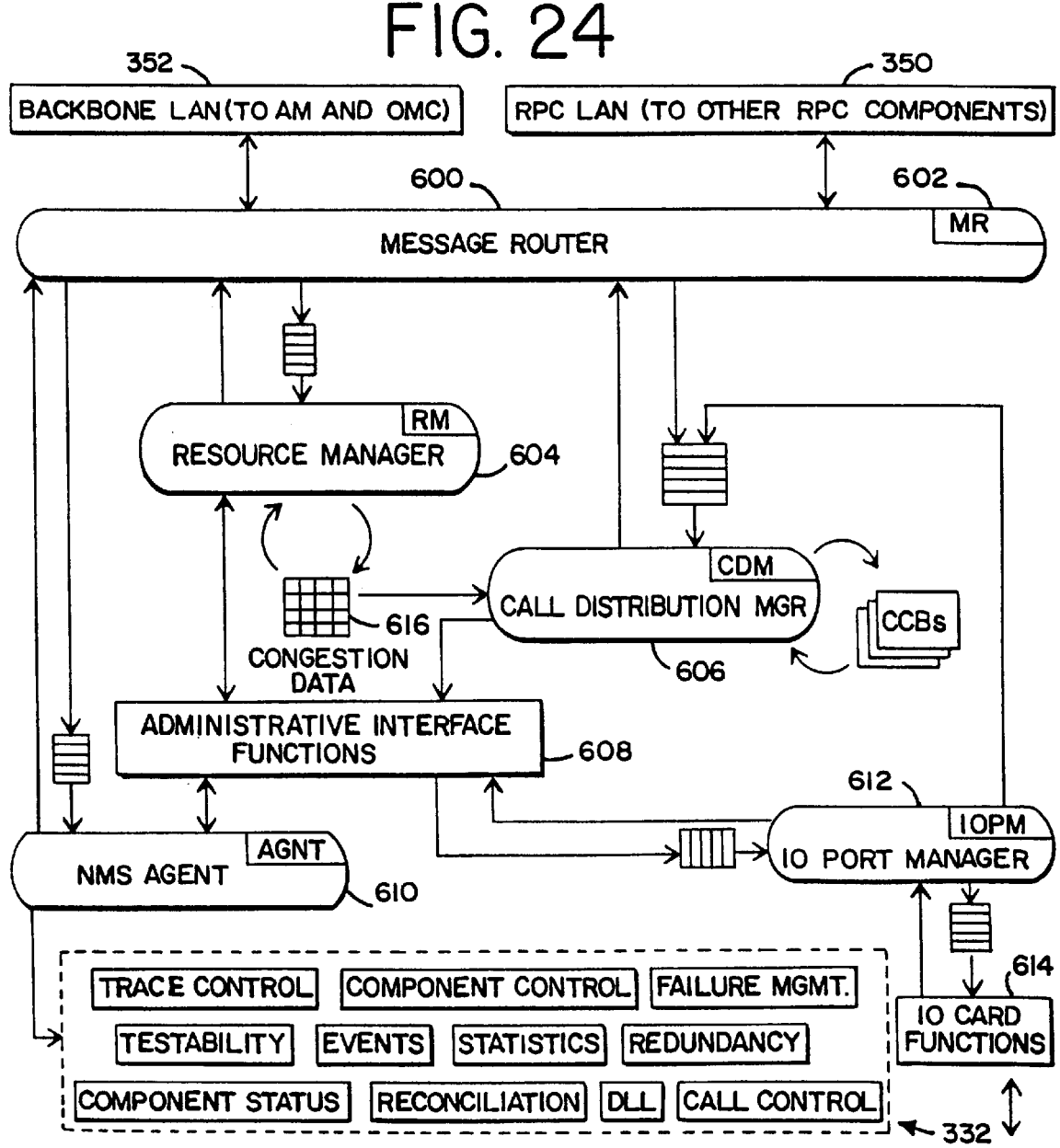
FIG. 24 is a block diagram of a global resource processor (GRP) that may be used within an RPC.

The call control task 552 may also have a thread that performs ALT DN management and a thread that routes messages to and from each of the state machine threads. The Global Resource Processor (GRP) 332 is a collection of tasks and functions that are executable preferably on a CPM board including an Intel 960 processor. As shown in FIG. 24, the GRP 332 includes a message router 600, a resource manager (RM) 604, a call distribution manager (CDM) 606, an administrative interface 608, a network management system (NMS) agent 610, and an Input/Output port manager (IOPM) 612. The message router 600 communicates with the AM 90 and the OMC 90 over the backbone LAN 352 and communicates with the other RPC components over the RPC LAN 350. The message router 600 is connected with the RM 604, the NMS agent 610, and the CDM 606. The CDM 606 is connected to the RM 604 through a congestion data block 616. The CDM 606 is also connected to the administrative interface 608 and the message router 600.

The IOPM 612 is connected to an IO card function module 614 that communicates with external communication links such as T1 lines. The IOPM 612 is connected to the CDM 606 and the administrative interface 608.

The RM task 604 is the central RPC 330 component responsible for handling resource shortages throughout the RPC 330. This task 604 manages buffers and queue shortages on RPC 330 components indicating a component's CPU is over-utilized with respect to the component's available memory. The RM 604 keeps track of global resources enabling the CDM 606 to balance the load among RPC processors. The RM 604 may throttle system activity within its control such that the offered traffic load is balanced against the available system resources. The RM 604 prevents the system from reaching a critical point in which increased activity results in a collapse of the components under the RM's 604 control.

The RM 604 manages congestion report messages received from components in the RPC 330 of the associated GRP 332. For each congestion report message, the RM 604 records appropriate statistics, and sends an acknowledgement to the sending component. The RM 604 manages a system resource table based on the congestion report messages. The RM 604 may receive commands for statistics reports from the NMS Agent (AGNT) 610.

The RM 604 recognizes the onset of system wide congestion in a way that protects against further congestion, reacts to congestion in a manner that is specific to the area of congestion and corresponds to the severity of the congestion level. The RM 604 allocates and tracks system resources available within the RPC so that traffic is prioritized in the order of emergency calls, existing traffic, and then new traffic with respect to the available resources.

The GRP 332 provides an interface to the OMC 70 for performing network management functions. The Network Management Agent 610 provides a transport mechanism to support these functions or may perform network management functions directly. The NMS Agent 610 performs the following functions: maintains statistics by application tasks in a global memory area, provides statistics to the OMC 70, monitors trace and control flags, maintains summary status information, processes alarms and call control requests, and supports processor downline loading and reconciliation.

Call control requests include call monitoring, call tracing, call path allocation, forced call handoff, and forced call clearing. The NMS agent 610 also handles call record management, component control in response to OMC commands, and debugging and testability support such as upline dump, and memory read/write.

The Call Distribution Manager (CDM) 606 provides call distribution and network management services. When a call setup is initiated, the CDM 606 determines the call identifier (RCID) and selects a CCP 338 for the call. The CDM 606 handles call manipulation requests (by controlling the appropriate CCP 338) from the OMC 70 such as call monitoring, forcing an ALT, clearing a call and fetching the status or statistics of a call.

The message router 600 allows the GRP 332 to perform call processing functions including distributing requests for call originations among active CCPs 338, providing via the Backbone LAN 352 an interface to other RPCs, initiating graceful disconnection of active calls when CCPs 338 fail, and polling active CCPs 338 for current call status information when switching in a backup GRP 332.

The IOPM 612 indicates when T1 line failures occur by frequently polling the IO Cards 614 minimizing the time between failure and resulting action. The IOPM 612 maintains and reports to the OMC 70 the status of I/O ports. The IOPM 612 also monitors T1 I/O Ports for alarm conditions and reports events to the OMC 70. Finally, the IOPM 612 may perform switchover for backup T1 cards in response to alarm conditions or to an operator request.

Another preferred embodiment allows the RPC 330 to perform functions traditionally handled in the AM 90. An RPC 330 performing traditionally AM functions may be implemented by adding a GRP 332 with an associated disk drive to the RPC 330. The disk drive includes various databases. These databases may provide for subscriber features, dynamic subscriber data, radio equipment configuration, altering area mapping, terminal location, routing instructions, call processing activity information, subscriber status, encryption information, or other subscriber desired information.

Traditionally AM functions provided in the RPC 330 on the added GRP 332 include authenticating and registering subscribers, administrating the radio network, managing billing information, and interacting with the database to determine the subscriber's radio location, status, alerting information, and terminating features. The GRP 332 may also control the 2 stage alerting process by first locating the SU 20 and then directing the switch to establish a voice connection to the RP 50 and alert the subscriber. The GRP 332 works with the switch to provide originating service for wireless calls. The GRP 332 instructs the switch 80 to associate the call origination with the subscriber. The GRP 332 may query the database for the subscriber's originating features and control the switch to provide that set of features.

Although a single added GRP 332 and disk drive have been disclosed, the present invention is not limited to the number or arrangement of GRPs 332 or storage devices such as disk drives used for performing at least some traditionally AM functions. A network including multiple GRPs 332, storage devices, or other RPC 330 processing components may be arranged in various ways for efficiently implementing traditionally AM functions in the RPC 330 of the present invention.

Examples of Message Flow RPC Operation

FIG. 25 shows the messages transmitted between various RPC 330 elements and the SU 20 for a layer 2 initial access message. The CP 362 (labeled STM960 in FIG. 25) receives a payload from the RP T1 line 368 communicating with the SU 20. The CP 362 distributes the payload to multiple Rx DSPs 364 to handle the individual time slots in the payload. Each Rx DSP 364 parses the time slot fast channel and determines that the payload is carrying an initial access message. The DSP 364 resets the acknowledge-mode-transfer link variables (NS/NR) and then forwards the initial access message through the CP 362 to the CAP 336 via the internal VME bus 348. The link manager 506 in the CAP 336 performs the necessary layer 2 protocol processing using the state machine 504 and sends an access confirm message via the CP 362 to the Tx DSP 364. The Tx DSP 364 formats the access confirm message in the fast channel of the time slot into a payload to be sent to the SU 20 over the RP T1 line 368.

FIG. 26 shows the message flow for a call origination from an SU 20. The Rx DSP 364 parses the fast channel and determines the call origination message is an acknowledge-mode-transfer (layer 3) message. The Rx DSP 364 performs acknowledge-mode-transfer processing including assembling the call origination message from the multiple segments received in the fast channel. The Rx DSP 364 also validates the checksum and sends an Info Ack Layer 2 message via shared RAM to the Tx DSP 364 for transmission over the RP T1 line 368 to the SU 20. When the complete layer 3 call origination message has been received, the Rx DSP 364 forwards the message to the CCP 338 via the CAP 336.

The CCP 338 performs layer 3 processing upon receiving the call origination message as defined in the layer 3 state machine (see Appendix A) and executed by the call control task 552. Layer 3 processing includes message exchange with the AM 90 and sending an RCID assign layer 3 message to the Tx DSP 364 via the CAP 336 and CP 362. The Tx DSP 364 fragments the layer 3 message into multiple segments if necessary and sends the RCID assign message to the SU 20. The Tx DSP 364 then performs ack-mode transfer processing such as waiting for any layer 2 info ack messages and retransmitting any unreceived message segments. The other messages shown in FIG. 26 are processed in a similar manner until the call is set up and a communication path is established through the RPC 330.

FIG. 27 shows the RPC 330 message flow for a call delivery. First the CCP 338 receives an alert message from the AM 90 and sends an internal alert message to the CAP 336. The CAP 336 uses the system broadcast task 502 to format an SBC superframe 510 that is sent to each STM 334 managed by that CAP 336. The SBC superframe message is then transmitted by each STM 334 in the SBC slot of the payload on the RP T1 line 368. The remaining messages are layer 2 and layer 3 messages that proceed in a similar manner as described for call origination until a call connection is established.

OTHER SYSTEM CONFIGURATIONS

Figure 28:
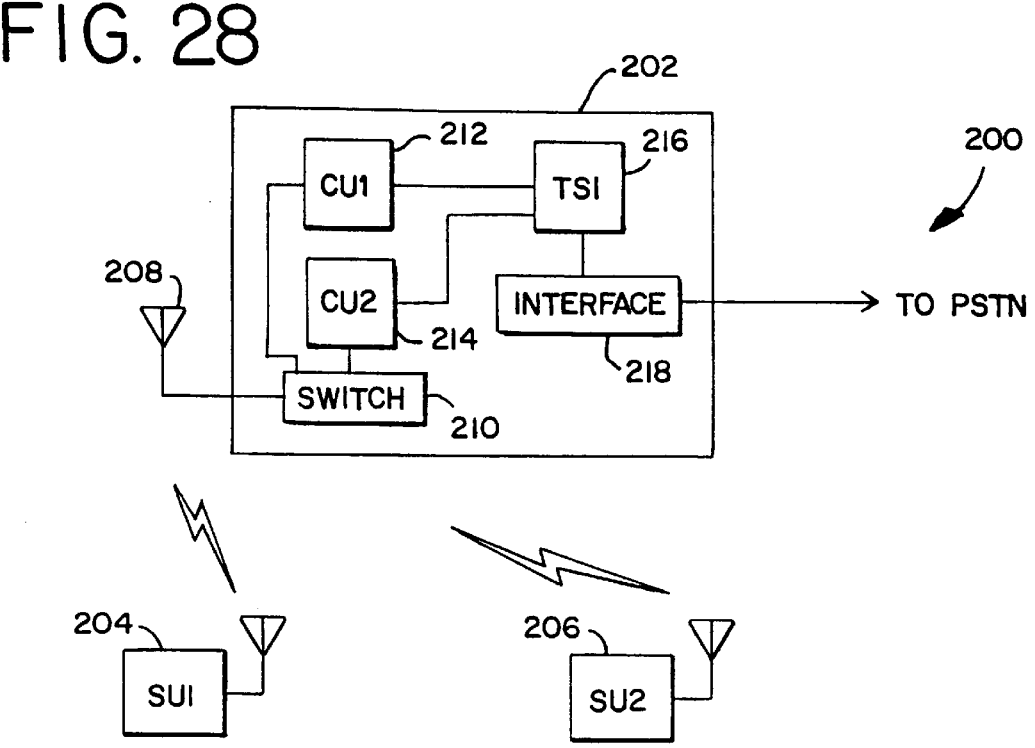
FIG. 28 is an illustration of a variation of the system shown in FIG. 1.

The PCS system may use the components in a variety of configurations. FIG. 28 shows a preferred embodiment of a portion of a PCS system 200 having a hybrid RP/RPC 202 capable of switching calls between two or more SUs 204, 206. In this embodiment the hybrid RP/RPC 202 contains the hardware of a regular RP 50 as described above and also includes a time slot interchange device 218. The time slot interface device 216 is capable of switching information between time slot frames in the eight frame messages 60, 70 of the TDM/TDMA format. The hybrid RP/RPC 202 contains two channel units (CU1, CU2) 212, 214, a switch 210, a time slot interface (TSI) 216, and a T1 interface card 218. The TSI 216 connects a memory location in CU1 212 to a memory location in CU2 214

Signals received from a first SU (SU1) 204 at the antenna assembly 208 of the hybrid RP/RPC 202 are transmitted through the switch 210 to the CU1 212. Signals received from a second SU (SU2) received at the antenna assembly 208 are transmitted through the switch 210 to the CU2 214. Both CU1 212 and CU2 214 communicate with the TSI 216. The TSI 216 swaps information between the time slots transmitted by the respective SUs 204, 206 to complete an SU to SU call. In a preferred embodiment, four separate calls, each having an SU 20 on each end of the call, can be handled by a single hybrid RP/RPC 202.

Figure 29:
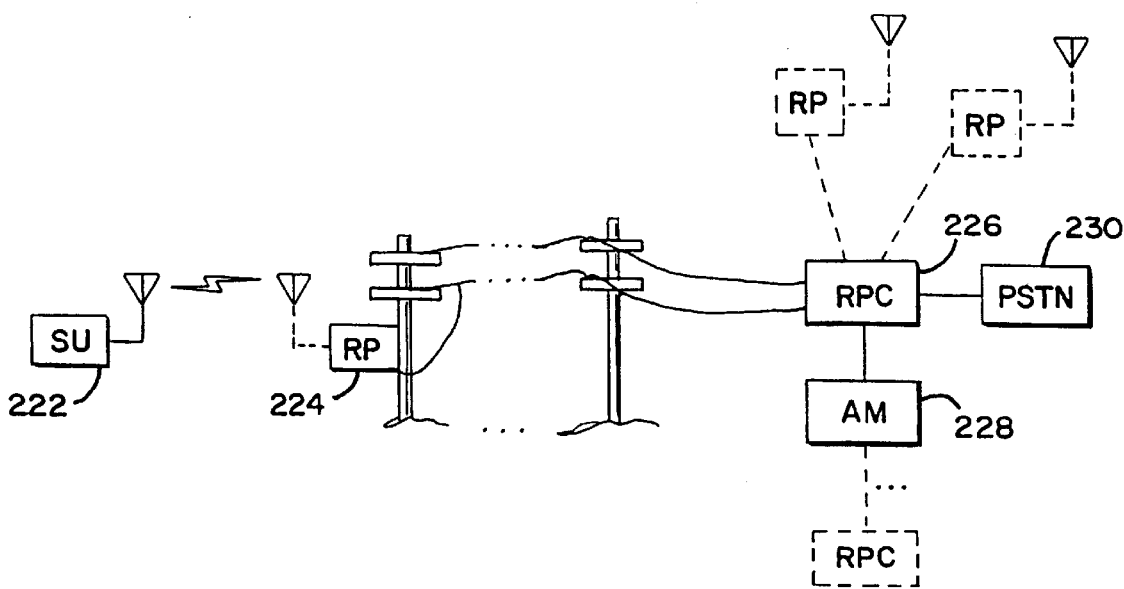
FIG. 29 is a diagrammatic illustration of a representative branch of the system of FIG. 1.

FIG. 29 illustrates a branch of the standard configuration of a wireless PCS system 220. The system 220 includes an SU 222, an RP 224, an RPC 226, and an AM 228. The SU 222 may be either portable or fixed. The RP 224 is preferably mounted on a telephone pole for better reception of radio frequencies and convenient access to telephone lines. The RPC 226 manages at least one RP 224 and calls are monitored by the AM 228. The RPC 226 is connected to the PSTN 230 for routing calls that cannot be switched within the system 220.

Figure 30:
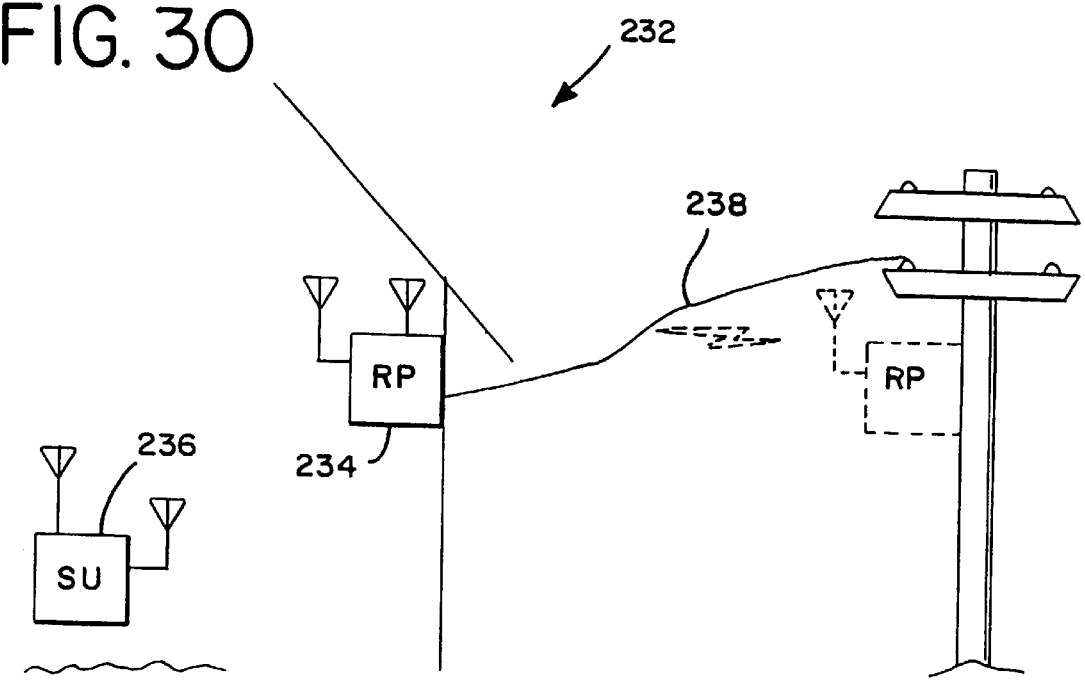
FIG. 30 is a representative stand-alone system for wireless communications.

FIG. 30 shows a stand-alone wireless PCS system 232. The stand-alone system 232 may act as an advanced cordless phone system. The RP 234 is mounted on the side of a home or business in this embodiment. By bringing the RP 234 down from the position on the telephone pole (see FIG. 29) as is the case in a more standard configuration, the system 232 acts more like a cordless phone system with the additional benefits of digital signal processing. One or more portable SUs 236 may communicate with the RP 234. Alternatively, a mixture of portable and fixed SUs may communicate with the RP 234. The RP 234 may communicate with an RPC or with the PSTN directly. Preferably the RP 234 receives the radio signals from the one or more SUs 236 and then places digital 64 kbps PCM signals on the telephone lines via a standard RJ-11 phone jack and a drop wire 238 attached to the structure in which the RP 234 is located. The stand-alone system 232 may also include paging features and internal calling between SUs 236 over unlicensed frequencies.

In another embodiment, of the stand-alone system 232 a hybrid RP/RPC, as described above, may replace the RP 234. Yet another embodiment of the system 232 includes an RP 234 mounted on the interior or exterior of a structure where there is no drop wire 238. Rather than communicating through a drop wire 238, the system uses an RP configured to send and receive signals to another RP positioned, for example, on a telephone pole over a radio link.

Figure 31:
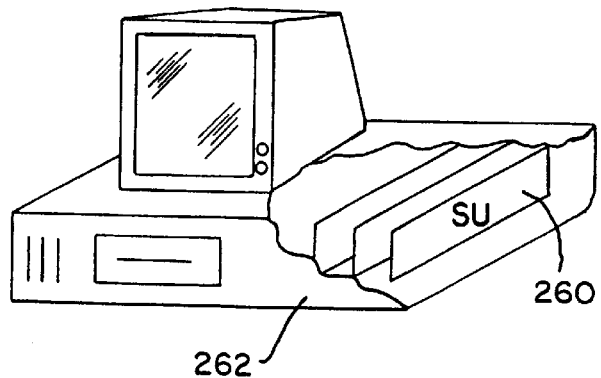
FIG. 31 is an illustration of an alternative embodiment of an SU.

FIG. 31 shows another embodiment of an SU. In this embodiment the SU is built on a computer board 260. The SU computer board 260 may just have data capability or may have data and voice. The SU board is simply placed in a personal or other form of computer 262 and may be part of any of the system configurations described herein.

Figure 32:
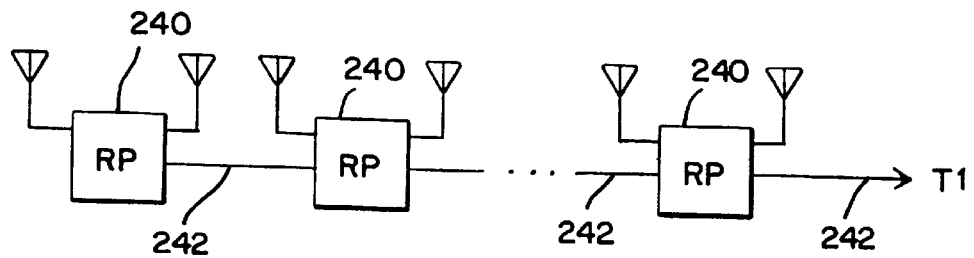
FIG. 32 is an illustration of an alternative configuration of a system architecture in a wireless personal communications system.

FIG. 32 shows another preferred embodiment of a wireless PCS system 238. In this embodiment, multiple RPs 240 may be linked together and connected to a single T1, or compatible, line 242. The RPs 240 may be connected together in serial fashion. As with the RP 50–RPC 30 interface, the interface may be a DS1, HDSL, a cable, microwave, or optical interface. Each RP 240 has access to a predetermined number of time slots in a message 60, 70. By dividing up time slots among the number of connected RPs 240, only one T1 line 242 is necessary thereby saving the system operator extra wiring and usage fees. Further, the serially connected RPs may be used in a stand-alone system or may be connected to the PSTN.

In one variation, the RPs 240 may only be tuned to a single RF frequency such that only eight calls may be handled. In another variation, multiple frequencies, each capable of carrying an eight frame message 60, 70, may be handled by the RPs 240 so that all available time slots on a T1 line or other interface is used. Also, a hybrid RP/RPC may be used in the serial configuration.

Figure 33:
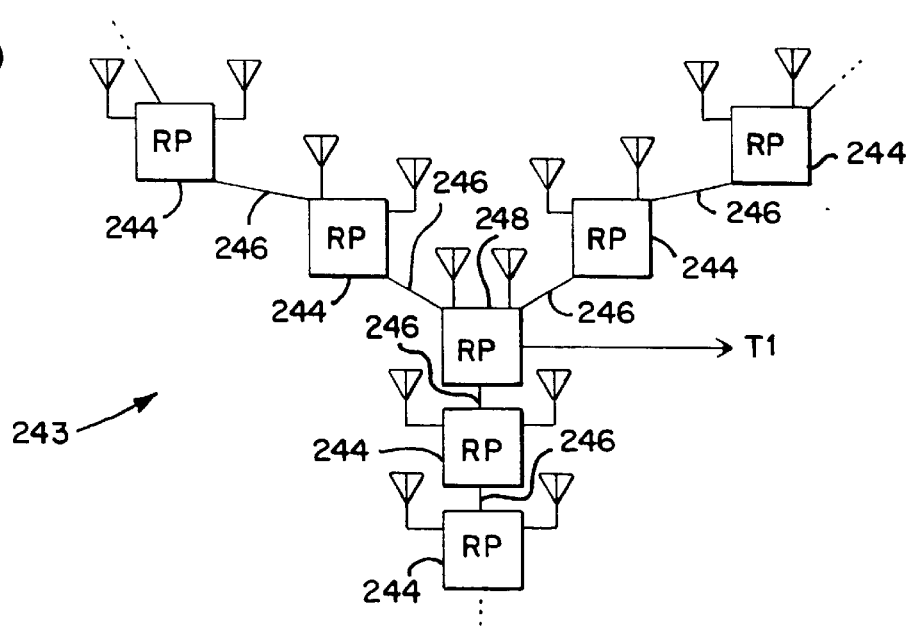
FIG. 33 is an illustration of an alternative configuration of a system architecture in a wireless personal communications system.
Figure 34:
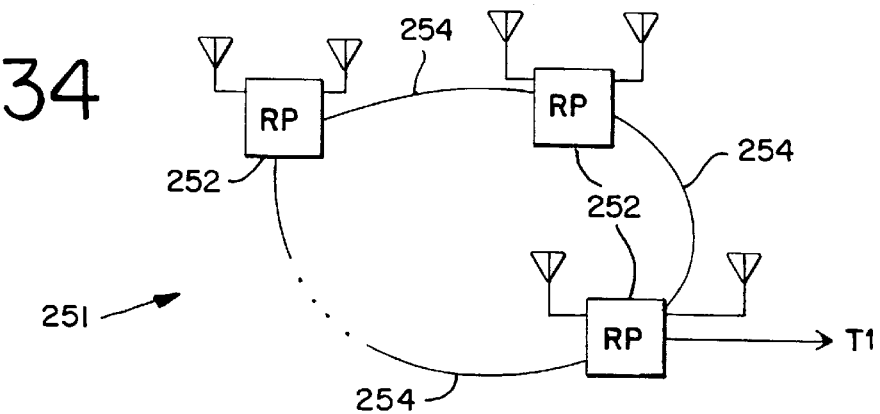
FIG. 34 is an illustration of an alternative configuration of a system architecture in a wireless personal communications system.
Figure 35:
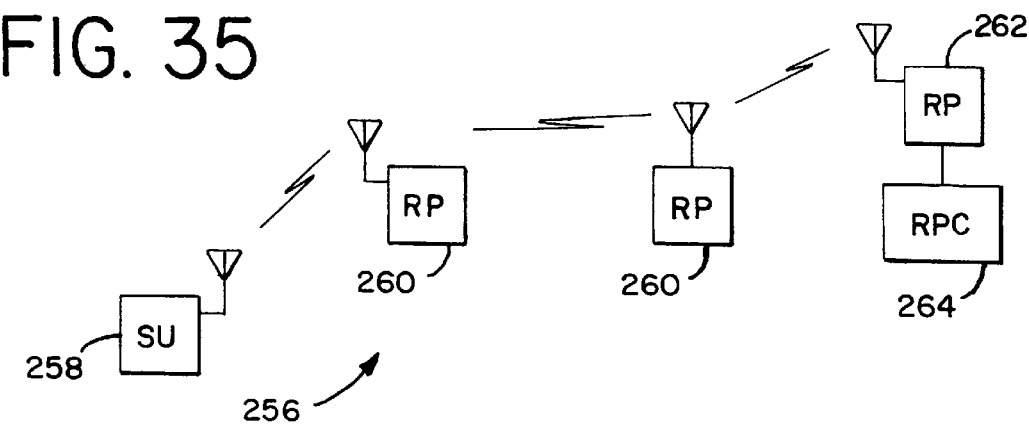
FIG. 35 is an illustration of an alternative configuration of a system architecture in a wireless personal communications system.

Other network configurations may also be implemented in a presently preferred PCS system. FIG. 33 illustrates a star configuration 243. The star configuration 243 may have chains of RPs 244 linked along a single, or multiple, T1 line 246. A central RP 248 may be configured internally to pass signals along however many branches are included. Another embodiment of the star configuration includes an RP 248 or a hybrid RP/RPC connected to a T1 or other suitable link that is connected to the PSTN, an RPC or another local area network (LAN). FIG. 34 shows another network configuration of RPs 252. This circular LAN 251 may be connected with T1 or other type data connections 254 capable of carrying the PCS message frames. FIG. 35 best shows a portion of a system 256 for use in remote areas or areas lacking any telephone infrastructure. The system 256 may include an SU or SUs 258 in communication with an RP 260 that is a simple relay/repeater transmitting to another RP repeater 260. The one or more RP repeaters 260 can transmit to a standard RP 262 in communication with an RPC 264 and a standard PCS system. Also, the RP repeaters 260 may connect the SU 258 to a hybrid RP/RPC for switching calls to other remote SU's. The flexibility of the repeater system 256 would allow for stand-alone systems to exist, communicate with each other if desired, and later be transformed into a public network if desired.

What is claimed is:

1. A wireless personal communications system for carrying voice and data communication signals, the system comprising:
   a radio port controller;
   a radio port coupled to the radio port controller, said radio port having an RF transmit section transmitting digital information in a time division multiplexed (TDM) message frame, the radio port including a channel switching unit; and
   first and second subscriber units, each of said subscriber units having an RF transmit section transmitting digital information in a time division multiple access (TDMA) format, wherein the channel switching unit is adapted to route communication signals between said first and second subscriber units without routing the communication signals through the radio port controller.

2. The system of claim 1, wherein said second subscriber unit is adapted for transmitting communication signals directly to said first subscriber unit without routing said communication signals through said radio port or said radio port controller.

3. The system of claim 2, wherein said second subscriber unit transmits the communication signals directly to said first subscriber unit over an unlicensed frequency.

4. The system of claim 1, wherein said system is a stand-alone system.

5. The system of claim 4, wherein said second subscriber communicates with said first subscriber over unused bandwidth available on existing cable television wires.

6. The system of claim 5, wherein said radio port controller has at least one digital microprocessor, said microprocessor having an interrupt of less than 1 millisecond.

7. A wireless personal communications system including:
   at least one radio port;
   at least two subscriber units, wherein one of said subscriber units communicates with another of said subscriber units through at least one of said at least one radio port;
   a radio port controller connected to said radio port, wherein said radio port controller has at least one digital microprocessor said microprocessor having an interrupt of less than 1 millisecond;
   said radio port controller further comprising:
      a first global resource processor for balancing loading among various other processors in the radio port controller;
      a second global resource processor;
      a disk drive coupled to the second global resource processor; and
      said second global resource processor cooperates with said disk drive to perform at least some of the traditional access manager functions.

8. A system according to claim 1, wherein one of said at least two subscriber units comprises a wireless terminal.

9. A system according to claim 1, wherein one of said at least two subscriber units comprises a wired terminal.

10. A wireless personal communications system comprising:
   a radio port having an RF transmit section transmitting digital information in a time division multiplexed (TDM) message frame; and
   first and second subscriber units, each of said subscriber units having an RF transmit section transmitting digital information in a time division multiple access (TDMA) format, said first and second subscriber units being adapted to selectively communicate with one another via said radio port, wherein said first subscriber unit may be accessed using the same dialed number as said second subscriber unit.

11. A system as defined in claim 10 wherein said first subscriber unit is individually accessed without accessing the second subscriber unit by entering a code in addition to said dialed number.

12. A wireless personal communications system comprising:
   a radio port controller including a switching transcoder module (STM) having a plurality of digital signal processors, each digital signal processor being capable of processing both digitized voice and personal communication system messages;
   a radio port coupled to the radio port controller, said radio port having an RF transmit section transmitting digital information in a time division multiplexed (TDM) format; and
   at least two subscriber units, each of said subscriber units having an RF transmit section transmitting digital information in a time division multiple access (TDMA) format, said subscriber units being adapted for selective communication with one another via said radio port.

13. The system of claim 12, further comprising a plurality of memory buffers in communication with said plurality of digital processors.

14. The system of claim 13, wherein said buffers are circular buffers adapted to receive and transmit personal communication system messages from a radio port or from a digital switch.

15. The system of claim 14, wherein each STM further includes a central processor for allocating each time slot in each T1 communication line to at least one of said digital signal processors.

16. The system of claim 15, wherein said central processor communicates with each digital signal processor using inter-processor data messages.

17. A wireless personal communications system comprising:
   a radio port controller including a channel access processor (CAP) for processing layer 2 personal communication system messages;
   a radio port coupled to the radio port controller, said radio port having an RF transmit section transmitting digital information in a time division multiplexed (TDM) message frame; and
   at least two subscriber units, each of said subscriber units having an RF transmit section transmitting digital information in a time division multiple access (TDMA) format, said subscriber units being adapted for selective communication with one another via said radio port.

18. A wireless personal communications system comprising:
   a radio port controller including a plurality of processors executing a multi-tasking operating system wherein at least one of said processors creates a thread associated with a call processing routine;
   a radio port coupled to the radio port controller, said radio port having an RF transmit section transmitting digital information in a time division multiplexed (TDM) message frame; and
   at least two subscriber units, each of said subscriber units having an RF transmit section transmitting digital information in a time division multiple access (TDMA) format, said subscriber units being adapted for selective communication with one another via said radio port.

19. A wireless personal communications system for carrying voice and data communication signals, at least some of the communication signals being in TDM/TDMA format, the system comprising:
   a radio port including a time slot interchange device for switching communication signals between time slot frames; and
   at least two subscriber units, a first one of the subscriber units transmitting communication signals in a first time slot frame and a second one of the subscriber units transmitting communication signals in a second time slot frame; wherein the time slot interchange device is adapted to switch the communication signals in the first time slot frame with the communication signals in the second time slot frame to permit direct communication between the first and second subscriber units through said radio port.

20. A system as defined in claim 19 wherein the time slot interchange device is further adapted to switch the communication signals in the first time slot frame with the communication signals in the second time slot frame.

* * * * *